US010956733B2

(12) United States Patent
Tsukamoto et al.

(10) Patent No.: US 10,956,733 B2
(45) Date of Patent: Mar. 23, 2021

(54) IMAGE PROCESSING APPARATUS AND IMAGE PROCESSING METHOD

(71) Applicant: SONY CORPORATION, Tokyo (JP)

(72) Inventors: Takeo Tsukamoto, Tokyo (JP); Shuichi Konami, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/901,681

(22) PCT Filed: Jun. 18, 2014

(86) PCT No.: PCT/JP2014/003265
§ 371 (c)(1),
(2) Date: Dec. 28, 2015

(87) PCT Pub. No.: WO2014/208052
PCT Pub. Date: Dec. 31, 2014

(65) Prior Publication Data
US 2016/0371812 A1   Dec. 22, 2016

(30) Foreign Application Priority Data

Jun. 26, 2013   (JP) ................................ 2013-133670

(51) Int. Cl.
*G06T 9/00*   (2006.01)
*G06T 7/33*   (2017.01)
(Continued)

(52) U.S. Cl.
CPC ..... *G06K 9/00604* (2013.01); *G06K 9/00288* (2013.01); *G06K 9/00617* (2013.01);
(Continued)

(58) Field of Classification Search
CPC ........... G06K 9/00228; G06K 9/00597; G06K 9/00221; G06K 9/3208; G06K 9/3275;
(Continued)

(56) References Cited

U.S. PATENT DOCUMENTS 6,493,470 B1 * 12/2002 Ikeda ................... G06K 9/3283
382/173
7,135,123 B1 * 11/2006 Thompson ......... G01R 31/2898
216/59

(Continued)

FOREIGN PATENT DOCUMENTS

JP   2009-199392 A   9/2009

OTHER PUBLICATIONS

M. Sonka et al. "Image Processing Analysis and Machine Vision", Cengage Learning, pp. 6, ISBN-13: 978-1133593607, CL Engineering, USA.

*Primary Examiner* — Kenny A Cese
(74) *Attorney, Agent, or Firm* — Chip Law Group

(57) ABSTRACT

An information processing system includes circuitry that inputs an image, and determines whether the image deviates from at least one desired image capture condition. The circuitry identifies a deviation amount of the image relative to the at least one desired image capture condition, and generates a deformed image in which a deviation from the at least one desired image capture condition is increased by a predetermined amount over the deviation amount identified.

15 Claims, 13 Drawing Sheets

(51) Int. Cl.
*G06K 9/00* (2006.01)
*H04N 5/232* (2006.01)
*G06T 3/00* (2006.01)
*G06T 11/60* (2006.01)
*H04W 12/06* (2021.01)
*H04L 29/06* (2006.01)
*H04N 5/225* (2006.01)

(52) U.S. Cl.
CPC ........ *G06K 9/00912* (2013.01); *G06T 3/0081* (2013.01); *G06T 7/337* (2017.01); *G06T 11/60* (2013.01); *H04N 5/23218* (2018.08); *H04N 5/232933* (2018.08); *H04W 12/06* (2013.01); *G06T 2200/24* (2013.01); *G06T 2200/28* (2013.01); *G06T 2207/20228* (2013.01); *G06T 2207/30172* (2013.01); *G06T 2207/30201* (2013.01); *G06T 2207/30244* (2013.01); *H04L 63/0861* (2013.01); *H04N 5/2257* (2013.01); *H04N 5/23222* (2013.01); *H04N 5/23245* (2013.01); *H04N 5/23293* (2013.01)

(58) Field of Classification Search
CPC .. G06K 9/68; G06K 9/00604; G06K 9/00288; G06K 9/00912; G06K 9/00617; G06F 3/013; G06F 3/0418; G06F 3/04845; G06T 3/0081; G06T 7/337
See application file for complete search history.

(56) References Cited

U.S. PATENT DOCUMENTS

| | | | |
|---|---|---|---|
| 7,894,640 B2 | 2/2011 | Itou | |
| 7,978,883 B2 | 7/2011 | Rouh et al. | |
| 2003/0095797 A1* | 5/2003 | Nakata | G02B 27/646 396/54 |
| 2003/0169334 A1 | 9/2003 | Braithwaite et al. | |
| 2005/0219393 A1* | 10/2005 | Sugimoto | H04N 5/23293 348/333.01 |
| 2005/0270386 A1 | 12/2005 | Saitoh et al. | |
| 2008/0259172 A1* | 10/2008 | Tamaru | H04N 5/23212 348/218.1 |
| 2009/0060394 A1* | 3/2009 | Yamazaki | G06K 9/3275 382/311 |
| 2010/0054620 A1* | 3/2010 | Kobayashi | G06T 3/0093 382/256 |
| 2010/0125816 A1* | 5/2010 | Bezos | G06F 1/1626 715/863 |
| 2010/0201828 A1* | 8/2010 | Mitsuya | H04N 5/217 348/208.6 |
| 2011/0074928 A1* | 3/2011 | Misawa | G06T 7/593 348/47 |
| 2011/0299795 A1* | 12/2011 | Shibata | G06T 3/4053 382/294 |
| 2012/0026326 A1* | 2/2012 | Itoh | G06K 9/00771 348/143 |
| 2012/0044369 A1* | 2/2012 | Irisawa | H04N 9/045 348/208.4 |
| 2013/0335442 A1* | 12/2013 | Fleck | G09G 3/003 345/629 |
| 2013/0342753 A1* | 12/2013 | Kitagawa | H04N 5/23229 348/349 |

* cited by examiner

IMAGE PROCESSING APPARATUS AND IMAGE PROCESSING METHOD

TECHNICAL FIELD

The present technology relates to an image processing apparatus, an image processing method, and a program. In particular, the present technology relates to, for example, an image processing apparatus, an image processing method, and a program capable of easily guiding a user to achieve a desired photography condition.

CROSS REFERENCE TO RELATED APPLICATIONS

This application claims the benefit of Japanese Priority Patent Application JP 2013-133670 filed Jun. 26, 2013, the entire contents of which are incorporated herein by reference.

BACKGROUND ART

Recently, for example, various apparatuses such as a smartphone, a mobile phone, a tablet, and a PC (Personal Computer) each having a photography function of photographing an image have become more and more popular. In accordance therewith, photography of an image has been frequently performed not only by digital cameras as apparatuses dedicated for photography of an image but also by apparatuses, which have the photography function, other than cameras.

Further, as the various apparatuses have a photography function, various applications using an image, which is photographed by the photography function, have been developed.

As the image-related application which is an application using the image photographed through the photography function, for example, there is an iris authentication device that photographs an image of a user's eye and identifies whether a user is a predetermined user by using the image of the eye (for example, refer to PTL 1).

CITATION LIST

Patent Literature

[PTL 1]
Japanese Unexamined Patent Application Publication No. 2009-199392

SUMMARY OF INVENTION

Technical Problem

Meanwhile, a photographed image, which is an image photographed by a user by using an apparatus (hereinafter referred to a photography function apparatus) having a photography function including a digital camera, may be deviated from, for example, a desired photography condition necessary for an image-related application.

However, it may be difficult for the user to recognize that the photographed image is deviated from the desired photography condition. In this case, it is difficult for the user who does not recognize the deviation from the desired photography condition to adjust the photography function apparatus such that the photographed image is in the desired photography condition.

According to the present technology, it is desirable to easily guide a user to achieve a desired photography condition.

Solution to Problem

In a first exemplary aspect, an information processing system includes circuitry that inputs an image, and determines whether the image deviates from at least one desired image capture condition. The circuitry also identifies a deviation amount of the image relative to the at least one desired image capture condition, and generates a deformed image in which a deviation from the at least one desired image capture condition is increased by a predetermined amount over the deviation amount identified.

In a second exemplary aspect, an information processing method includes inputting an image using circuitry and determining, using the circuitry, whether the image deviates from at least one desired image capture condition. The method also includes identifying, using the circuitry, a deviation amount of the image relative to the at least one desired image capture condition, and generating, using the circuitry, a deformed image in which a deviation from the at least one desired image capture condition is increased by a predetermined amount over the deviation amount identified.

In a third exemplary aspect, a non-transitory computer-readable medium is encoded with computer-readable instructions that, when executed by a computer, cause the computer to perform a method that includes inputting an image. The method also includes determining whether the image deviates from at least one desired image capture condition, and identifying a deviation amount of the image relative to the at least one desired image capture condition. Then the method generates a deformed image in which a deviation from the at least one desired image capture condition is increased by a predetermined amount over the deviation amount identified.

Advantageous Effects of Invention

According to the present technology, it is possible to easily guide a user to achieve a desired photography condition.

It should be noted that the effects in the description are just examples and effects of the present technology are not limited to the effects in the description but there may be additional effects.

DESCRIPTION OF EMBODIMENTS

<Image Processing Apparatus According to Embodiment of Present Technology>

Figure 1:
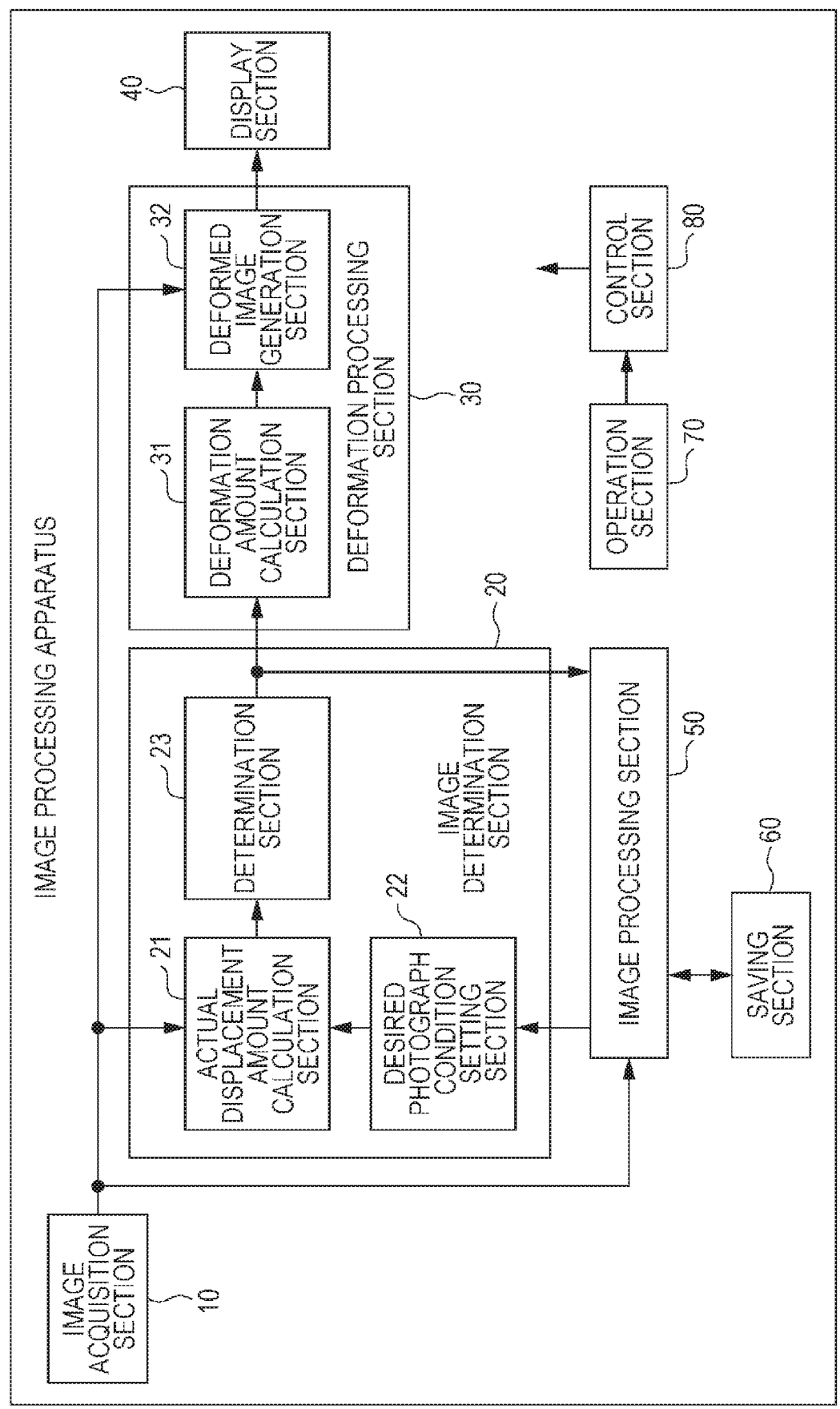
FIG. 1 is a block diagram illustrating an exemplary configuration of an image processing apparatus according to an embodiment of the present technology.

FIG. 1 is a block diagram illustrating an exemplary configuration of an image processing apparatus according to an embodiment of the present technology.

The image processing apparatus of FIG. 1 can be applied to various apparatuses such as a smartphone, a mobile phone, a tablet, or a PC. Here, it is assumed that the image processing apparatus of FIG. 1 is applied to, for example, a smartphone.

In FIG. 1, the image processing apparatus as a smartphone has an image acquisition section 10, an image determination section 20, a deformation processing section 30, a display section 40, an image processing section 50, a saving section 60, an operation section 70, and a control section 80.

The image acquisition section 10 acquires an image in accordance with, for example, a user's operation in the operation section 70, and supplies the acquired image to the image determination section 20, a deformation processing section 32, and the image processing section 50.

That is, the image acquisition section 10 is, for example, a photographing section that photographs an image, and photographs an image and supplies the photographed image, which can be obtained from the result thereof, as the acquired image to the image determination section 20, the deformation processing section 32, and the image processing section 50.

Besides, the image acquisition section 10 functions as, for example, an interface with a network such as the Internet or an interface with an image providing apparatus, which is capable of providing an image, such as a digital camera. Thus, the image acquisition section 10 is able to acquire an image on a network, an image provided from the image providing apparatus, and the like through wired communication, wireless communication, or the like.

It should be noted that, hereinafter, the following assumptions are used. The image acquisition section 10 is, for example, a photographing section that photographs an image. The photographed image, which is photographed by the photographing section, is supplied from the image acquisition section 10 as the photographing section to the image determination section 20, the deformation processing section 32, and the image processing section 50.

The image determination section 20 determines whether the photographed image (acquired image) acquired from the image acquisition section 10 is deviated from the desired photography condition, and supplies deviation determination information, which represents the determination result, to the deformation processing section 30 and the image processing section 50.

That is, the image determination section 20 has an actual displacement amount calculation section 21, a desired photography condition setting section 22, and a determination section 23.

The actual displacement amount calculation section 21 is supplied with the photographed image from the image acquisition section 10, and is supplied with the desired photography condition information from the desired photography condition setting section 22.

The actual displacement amount calculation section 21 calculates an actual amount of displacement, and supplies the amount to the determination section 23. Here, the actual amount of displacement is an amount of deviation representing the deviation between the photographed image condition, which is acquired from the image acquisition section 10, and the desired photography condition which is represented by the desired photography condition information acquired from the desired photography condition setting section 22.

For example, in response to a request from the image processing section 50, the desired photography condition setting section 22 sets the desired photography condition, which is an optimal photography condition of the photographed image in (image processing of) the image processing section 50, and supplies the desired photography condition information, which represents the desired photography condition, to the actual displacement amount calculation section 21.

The determination section 23 determines whether the photographed image acquired from the image acquisition section 10 is deviated from the desired photography condition, on the basis of the actual amount of displacement obtained from the actual displacement amount calculation section 21, and supplies the deviation determination information, which represents the determination result, to the deformation processing section 30 and the image processing section 50.

In addition, the deviation determination information includes the actual amount of displacement obtained from the actual displacement amount calculation section 21.

The deformation processing section 30 generates a deformed image as a greatly deviated image in which a deviation from the desired photography condition is increased, on the basis of the deviation determination information supplied from the determination section 23 of the image determination section 20, and supplies the deformed image to the display section 40.

That is, the deformation processing section 30 has a deformation amount calculation section 31 and a deformed image generation section 32.

The deformation amount calculation section 31 is supplied with the deviation determination information from the determination section 23 of the image determination section 20.

The deviation determination information obtained from the determination section 23 may indicate that the photographed image is deviated from the desired photography condition. In this case, the deformation amount calculation section 31 calculates the amount of deformation of the deformed image as the amount of deviation (amount of great deviation) of the greatly deviated image from the desired photography condition, for example, on the basis of the actual amount of displacement included in the deviation determination information obtained from the determination section 23. Then, the deformation amount calculation section 31 supplies the amount of deformation to the deformed image generation section 32.

In addition, when the deviation determination information indicates that the photographed image is not deviated from the desired photography condition, the deformation amount calculation section 31 supplies the amount of deformation of, for example, 0 to the deformed image generation section 32.

The deformed image generation section 32 generates the greatly deviated image, that is, for example, the deformed image, by using a predetermined graphics image or the photographed image supplied from the image acquisition section 10. Then, the deformed image generation section 32 supplies the image to the display section 40. Here, in the greatly deviated image, the deviation (deviation between the photographed image and the desired photography condition) from the desired photography condition is increased by the amount of deformation supplied from the deformation amount calculation section 31. In addition, in the deformed image, the deviation from the desired photography condition is deformed.

In addition, when the amount of deformation supplied from the deformation amount calculation section 31 is 0, the deformed image generation section 32 supplies the photographed image supplied from the image acquisition section 10 or the predetermined graphics image to the display section 40, as it is.

The display section 40 is formed as a liquid crystal panel, an organic EL (Electro-Luminescence) panel, or the like. The display section 40 displays an image (a photographed image, a predetermined graphics image, or a deformed image which is obtained by deforming a photographed image or a predetermined graphics image) supplied from the deformed image generation section 32 of the deformation processing section 30.

The image processing section 50 is, for example, an image-related application using the photographed image acquired from the image acquisition section 10. The image processing section 50 encodes the photographed image acquired from the image acquisition section 10, saves (stores) the image in the saving section 60, and performs predetermined image processing using a photographed image other than that.

That is, the image processing section 50 issues a request to the desired photography condition setting section 22. The request is to obtain the photographed image in the photography condition, which is optimum for (or image processing of) the image processing section 50.

In addition, the determination section 23 supplies the deviation determination information to the effect that the photographed image is not deviated from the desired photography condition (the effect that the photographed image is in the desired photography condition). At that time, the image processing section 50 performs the predetermined image processing by using the photographed image supplied from the image acquisition section 10.

Here, as the image-related application, for example, there are authentication devices that release locking of an image processing apparatus as a smartphone by performing iris authentication or face authentication. Besides, as the image-related application, for example, there are photography assistance devices which assist in photography when photography to obtain a face image such as an ID photo focused on a face, macro photography in which a subject is extremely close-up, or other arbitrary photography is performed.

The saving section 60 is a semiconductor memory, a hard disk, or the like, and stores (saves) the photographed image supplied from the image processing section 50 in accordance with control from the image processing section 50.

The operation section 70 is a physical button or a virtual button that is displayed on a touch screen (which is integrated into the display section 40), and is operated by a user. The operation section 70 supplies an operation signal corresponding to the user's operation to the control section 80.

The control section 80 controls respective blocks constituting the image processing apparatus as a smartphone, in response to the operation signal or the like from the operation section 70.

Figure 2:
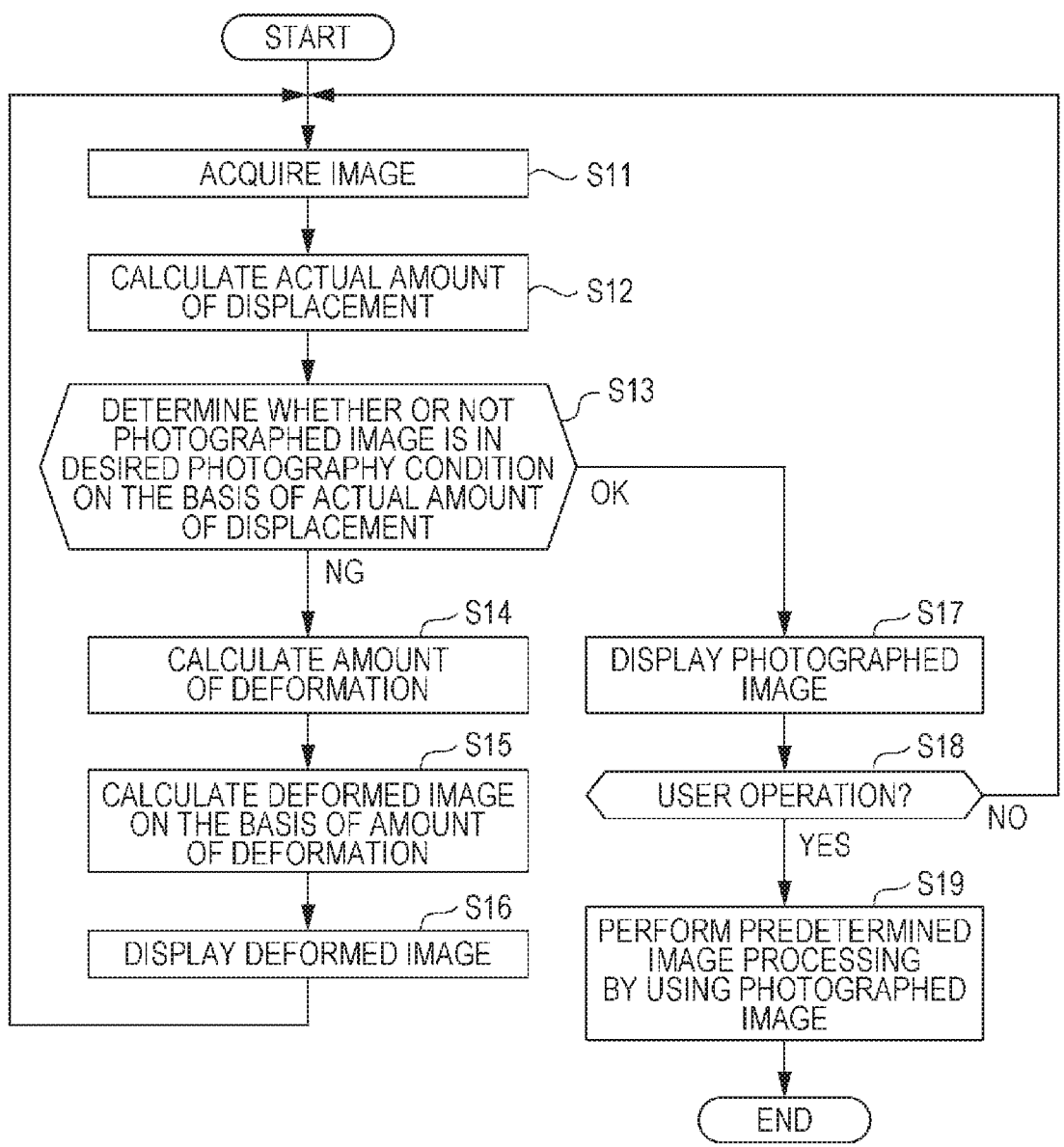
FIG. 2 is a flowchart illustrating processes of the image processing apparatus.

FIG. 2 is a flowchart illustrating processes of the image processing apparatus as the smartphone of FIG. 1.

In addition, the desired photography condition setting section 22 sets the desired photography condition, which is optimum for (image processing of) the image processing section 50, in advance in response to the request from the image processing section 50, and supplies the desired photography condition information, which represents the desired photography condition, to the actual displacement amount calculation section 21.

In step S11, the image acquisition section 10 acquires an image through, for example, photography, and supplies the image to the actual displacement amount calculation section 21, the deformed image generation section 32, and the image processing section 50, and the procedure advances to step S12.

In step S12, the actual displacement amount calculation section 21 calculates an actual amount of displacement, and supplies the amount to the determination section 23. Here, the actual amount of displacement is an amount of deviation representing the deviation of the photographed image (condition), which is acquired from the image acquisition section 10, from the desired photography condition which is represented by the desired photography condition information acquired from the desired photography condition setting section 22. Then, the procedure advances to step S13.

In step S13, the determination section 23 determines whether the photographed image acquired from the image acquisition section 10 is deviated from the desired photography condition, on the basis of the actual amount of displacement obtained from the actual displacement amount calculation section 21.

In step S13, if it is determined that the photographed image is deviated from the desired photography condition, the determination section 23 makes the deviation determination information include the actual amount of displacement obtained from the actual displacement amount calculation section 21. The deviation determination information is information to the effect that the photographed image is deviated from the desired photography condition. Then, the determination section 23 supplies the information to the deformation amount calculation section 31, and the procedure advances to step S14.

In step S14, the deformation amount calculation section 31 calculates the amount of deformation of the deformed image on the basis of the actual amount of displacement, which is included in the deviation determination information, in accordance with the deviation determination information obtained from the determination section 23. The deviation determination information is information to the effect that the photographed image is deviated from the desired photography condition. Then, the deformation amount calculation section 31 supplies the amount to the deformed image generation section 32, and the procedure advances to step S15.

In step S15, the deformed image generation section 32 generates the deformed image, in which the deviation from the desired photography condition is deformed by the amount of deformation supplied from the deformation amount calculation section 31, for example, by using the photographed image supplied from the image acquisition section 10. Then, the deformed image generation section 32 supplies the image to the display section 40, and the procedure advances to step S16.

In step S16, in the display section 40, the deformed image obtained from the deformed image generation section 32 is displayed.

Then, returning to step S11 from step S16, hereinafter, until it is determined that the photographed image is not deviated from the desired photography condition in step S13, the procedure of steps S11 to S16 is repeated.

Accordingly, while (it is determined that) the photographed image is deviated from the desired photography condition, the display section 40 displays the deformed image.

In contrast, in step S13, it may be determined that the photographed image is not deviated from the desired photography condition, that is, the photographed image may be in the desired photography condition. In this case, the determination section 23 supplies the deviation determination information to the deformation amount calculation section 31 and the image processing section 50. The deviation determination information is information to the effect that the photographed image is not deviated from the desired photography condition. Then, the procedure advances to step S17.

Here, when the deviation determination information indicates that the photographed image is not deviated from the desired photography condition, the deformation amount calculation section 31 supplies the amount of deformation of 0 to the deformed image generation section 32. Then, when the amount of deformation supplied from the deformation amount calculation section 31 is 0, the deformed image generation section 32 supplies, for example, the photographed image supplied from the image acquisition section 10 to the display section 40, as it is.

As a result, in step S17, the display section 40 displays the photographed image acquired by the image acquisition section 10, that is, the photographed image which is in the desired photography condition, and the procedure advances to step S18.

As described above, when the photographed image is in the desired photography condition, the display section 40 displays not the deformed image, but the photographed image which is in the desired photography condition.

In step S18, the control section 80 determines whether the operation section 70 is operated, that is, for example, whether the shutter button (release button) which is included in the operation section 70 and not shown in the drawing is operated.

In step S18, if it is determined that the operation section 70 is not operated, the procedure returns to step S11.

Further, in step S18, if it is determined that the operation section 70 is operated, the procedure advances to step S19. Then, the image processing section 50 performs predetermined image processing of storing the photographed image, which is supplied from the image acquisition section 10, that is, the photographed image, which is in the desired photography condition, in the saving section 60, and ends the procedure.

In addition, in FIG. 2, when the operation section 70 is operated after the photographed image is in the desired photography condition, the image processing section 50 performs the image processing. However, when the photographed image is in the desired photography condition, the image processing section 50 performs the image processing without waiting for the operation of the operation section 70.

Alternatively, when the photographed image is in the desired photography condition while the operation section 70 is operated, the image processing section 50 performs the image processing.

Specific Example of Deformed Image

Hereinafter, a description will be given of a specific example of the deformed image in an exemplary case where the image processing section 50 as the image-related application is for example an iris authentication device.

Figure 3:
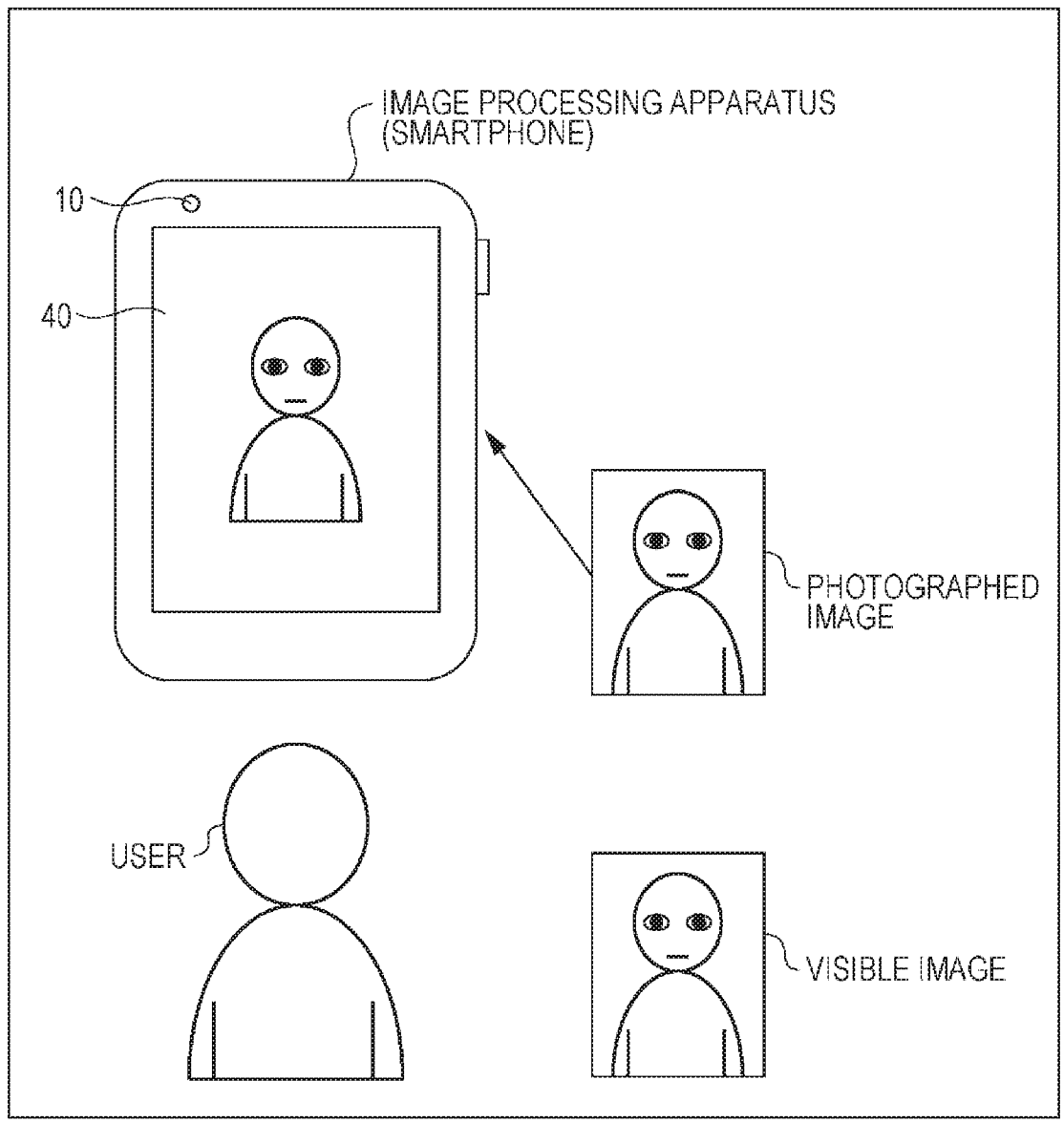
FIG. 3 is a diagram illustrating a situation in which a user photographs a user themself.

FIG. 3 is a diagram illustrating a situation in which a user photographs a user themself in order to perform iris authentication in the image processing apparatus as the smartphone of FIG. 1.

In the image processing apparatus as the smartphone of FIG. 3, the photographing section, which photographs an image, as an image acquisition section 10 is provided to be coplanar with the display screen of the display section 40.

Here, it is assumed that, as operation modes of the image processing apparatus as the smartphone, the display section 40 has the following modes: a normal mode in which the photographed image photographed by the image acquisition section 10 is displayed as a so-called live view image on the display section 40; and a deformation mode in which the deformed image is displayed as a live view image. In addition, the operation mode can be switched to the normal mode or the deformation mode in accordance with, for example, the user's operation in the operation section 70 or the like.

In the normal mode, the photographed image photographed by the image acquisition section 10 is displayed as the live view image on the display section 40. A user is able to adjust a direction (photography direction) of the smartphone, a position of the smartphone, a posture of the user themself, and the like such that the user themself as a subject shown in the photographed image is in an appropriate condition while viewing the photographed image as the live view image displayed on the display section 40.

Then, when the photographed image is in a condition which is appropriate on the basis of judgment of a user, that is, for example, when the image is in a condition where an image of the user shown in the photographed image has a size appropriate on the basis of judgment of the user and is disposed at a position appropriate on the basis of judgment of the user, the user operates the shutter button which is included in the operation section 70 and is not shown in the drawing.

When the user operates the shutter button, at that time, the image processing section 50 performs, for example, predetermined image processing of storing the photographed image, which is photographed by the image acquisition section 10, in the saving section 60.

Here, FIG. 3 shows an example of display of the live view image of the display section 40 in the normal mode.

In FIG. 3, the photographed image photographed by the image acquisition section 10 is displayed as the live view image on the display section 40, as it is.

In addition, FIG. 3 (and also the following drawings) shows a visible image. The visible image is an image of the user which is visible when the user facing toward the opposite side is viewed from a third party on the opposite side.

That is, FIG. 3 (and also the following drawings) shows the user facing toward the display screen side of the display section 40 of the image processing apparatus as the smartphone. Thus, in the drawing, it is difficult to show the user facing toward the display screen side so as to be able to check a condition such as expression of the user.

Hence, FIG. 3 (and also the following drawings) shows a visible image as an image of the user which is visible for the third party when the third party is on the opposite side (the display screen side of the display section 40) so as to be able to check the condition such as the expression of the user facing the opposite side.

In the normal mode, as described above, when the photographed image is in the condition which is appropriate on the basis of judgment of the user, image processing using the photographed image such as image processing of storing the photographed image in the saving section 60 is performed.

Accordingly, for example, in the case of performing iris authentication as the image processing using the photographed image, in the normal mode, it is difficult to capture the photographed image in the photography condition appropriate for iris authentication.

That is, for a user who is bad at iris authentication, it is unclear whether the photographed image is in the photography condition appropriate for iris authentication. For this reason, it may be difficult for the user to recognize that the photographed image is deviated from the image in the photography condition appropriate for iris authentication, and it may be difficult to capture the photographed image in the photography condition appropriate for iris authentication.

For this reason, in the deformation mode, it is determined whether the photographed image is deviated from the desired photography condition which is the photography condition appropriate for iris authentication. If the photographed image is deviated from the desired photography condition, a deformed image is displayed as a live view image on the display section 40. In the deformed image, deformation, which is necessary for the photographed image to be in the desired photography condition, is performed in a direction opposite to a direction of adjustment of the image processing apparatus as the smartphone. That is, in the deformed image, the deviation of the photographed image from the desired photography condition is emphasized.

The user easily recognizes that the photographed image is deviated from the desired photography condition by viewing the deformed image as a live view image. Thereby, the user is able to adjust the direction of the image processing apparatus as the smartphone and the like such that the photographed image is in the desired photography condition, with reference to the deformed image as a negative example.

Consequently, using the deformation mode, it is possible to easily guide a user to achieve a desired photography condition.

It should be noted that factors of the photographed image, which can be in the desired photography condition, include, for example, the position, the size (angle of view, area), the angle (direction), the focus, the facial expression, and the like of the subject shown in the photographed image.

As the desired photography condition, for example, the following conditions can be employed: the position of the subject shown in the photographed image is on the vertical line that divides the photographed image into two equal parts on the right and left sides; the size (area) of the subject shown in the photographed image occupies a predetermined proportion or more of the area of the photographed image; the direction of the subject shown in the photographed image is right opposite to the apparatus; the subject is focused, and thus the subject is not blurred; and an expression of a person as the subject shown in the photographed image is an expression in which eyelids are open as normally they are, and thus the entire iris is shown in the photographed image.

Besides, as the desired photography condition, for example, the following condition can be employed: the expression of the person as the subject shown in the photographed image is a smiling expression or closed mouth expression.

Figure 4:
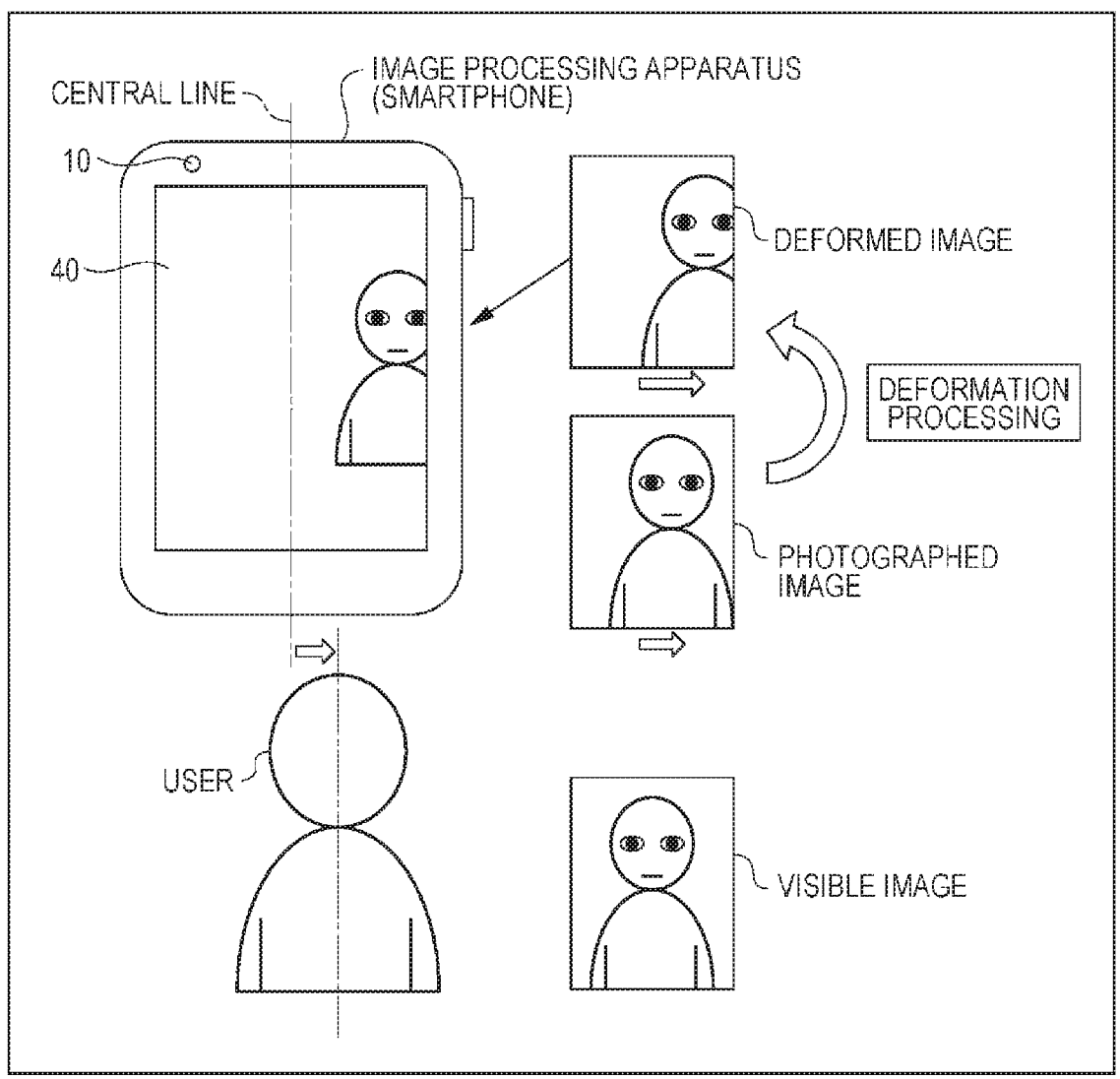
FIG. 4 is a diagram illustrating a first specific example of a deformed image.

FIG. 4 is a diagram illustrating a first specific example of a deformed image.

In FIG. 4, the position of the user as the subject shown in the photographed image is deviated to the right side, relative to a condition in which the user is at a position (predetermined position) on the central line which is the vertical line dividing the photographed image into two equal parts on the right and left side.

Here, the desired photography condition may be a condition in which the position of the user shown in the photographed image is a position on the central line. In this case, the actual displacement amount calculation section 21 of the image determination section 20 calculates, as the actual amount of displacement, an amount of positional deviation of the position of the user shown in the photographed image from the position on the central line to the right side.

Then, the determination section 23 of the image determination section 20 determines that the photographed image is not in the desired photography condition, on the basis of the amount of positional deviation to the right side as the actual amount of displacement. Then, the deviation determination information, which includes the amount of positional deviation to the right side, is supplied to the deformation processing section 30.

On the basis of the amount of positional deviation to the right side as the actual amount of displacement included in the deviation determination information obtained from the image determination section 20, the deformation amount calculation section 31 of the deformation processing section 30 calculates an amount of positional deviation to the right side, which is obtained by increasing the magnitude of the amount of positional deviation, as the amount of deformation.

Further, the deformed image generation section 32 of the deformation processing section 30 generates a deformed image which is obtained by deforming the photographed image supplied from the image acquisition section 10 by the amount of deformation, and the display section 40 displays the image.

That is, in the deformation processing section 30, the amount of positional deviation to the right side, which is obtained by increasing the magnitude of the amount of positional deviation to the right side as the actual amount of displacement, is set as the amount of deformation. Then, on the basis of the amount of deformation, an image, in which the position of the user shown in the photographed image is greatly deviated from the position on the central line to the right side relative to the actual amount of displacement, is generated as a deformed image.

Then, the display section 40 displays the above-mentioned deformed image, that is, the image in which the position of the user shown in the photographed image is greatly deviated from the position on the central line to the right side relative to the actual amount of displacement. Thereby, the user is able to recognize that the position of the user shown in the photographed image is deviated from the position on the central line to the right side and the photographed image is not an appropriate image (for the image processing section 50 as the image-related application).

In this case, while viewing the deformed image, the user adjusts the posture or the position of the user themself or the posture or the position of the image processing apparatus as the smartphone so as to correct (eliminate) the amount of great positional deviation to the right side as the amount of deformation applied to the deformed image. As a result, it is possible to obtain an appropriate photographed image, that is, a photographed image in which the position of the user shown in the photographed image is the position on the central line.

The determination section 23 is able to determine whether the photographed image is in the desired photography condition in which the position of the user shown in the photographed image is the position on the central line, on the basis of the actual amount of displacement calculated, for example, in the following manner. In the actual displacement amount calculation section 21 of the image determination section 20, by applying a face authentication technology or the like to the photographed image, a face of the user as the subject shown in the photographed image is recognized, and the distance between the center of the face and the central line of the photographed image is calculated as the actual amount of displacement.

It should be noted that the above-mentioned method using the face authentication technology does not limit the method of determining whether the photographed image is in the desired photography condition in which the position of the user shown in the photographed image is the position on the central line.

Figure 5:
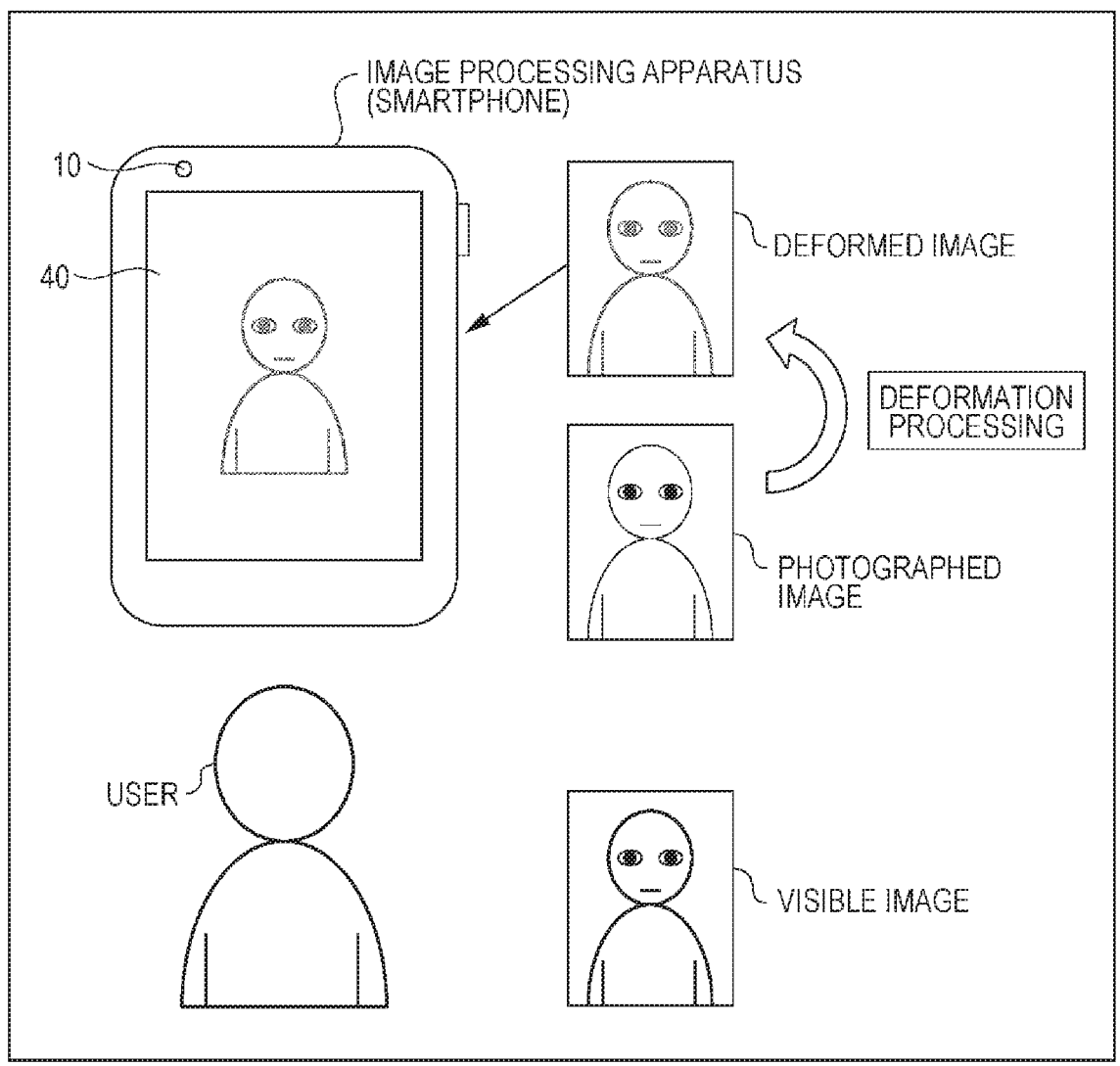
FIG. 5 is a diagram illustrating a second specific example of a deformed image.

FIG. 5 is a diagram illustrating a second specific example of a deformed image.

In FIG. 5, due to the distance between the user and (the image acquisition section 10 of) the image processing apparatus as the smartphone being excessively short or excessively long, the user as the subject shown in the photographed image is slightly blurred.

Here, when the desired photography condition is a condition in which the user shown in the photographed image is focused, the actual displacement amount calculation section 21 of the image determination section 20 calculates an amount of blur, which indicates a degree of defocus of the user shown in the photographed image, as the actual amount of displacement.

Then, the determination section 23 of the image determination section 20 determines that the photographed image is not in the desired photography condition, on the basis of the amount of blur as the actual amount of displacement, and supplies the deviation determination information including the amount of blur to the deformation processing section 30.

On the basis of the amount of blur as the actual amount of displacement included in the deviation determination information obtained from the image determination section 20, the deformation amount calculation section 31 of the deformation processing section 30 calculates an amount of blur, which is obtained by increasing the magnitude of the amount of blur, as the amount of deformation.

Further, the deformed image generation section 32 of the deformation processing section 30 generates a deformed image which is obtained by deforming the photographed image supplied from the image acquisition section 10 by the amount of deformation, and the display section 40 displays the image.

That is, in the deformation processing section 30, an amount of blur, which is obtained by increasing the magnitude of the amount of blur as the actual amount of displacement, is set as the amount of deformation. Then, on the basis of the amount of deformation, an image, in which the user shown in the photographed image is further blurred, is generated as a deformed image.

Then, the display section 40 displays the above-mentioned deformed image, that is, the image in which the user shown in the photographed image is further blurred. Thereby, the user is able to recognize that the user shown in the photographed image is defocused and the photographed image is not an appropriate image (for the image processing section 50 as the image-related application).

In this case, while viewing the deformed image, the user adjusts the distance between the user themself and the image processing apparatus as the smartphone to an appropriate distance so as to correct (eliminate) the amount of blur as the amount of deformation applied to the deformed image. As a result, it is possible to obtain an appropriate photographed image, that is, a photographed image in which the user shown in the photographed image is focused.

For example, in the following manner, it is possible to determine whether the photographed image is in the desired photography condition in which the user shown in the photographed image is focused.

That is, the actual displacement amount calculation section 21 of the image determination section 20 sets a region, which includes the user shown in the photographed image during a latest predetermined period, as an observed region, calculates contrasts of the observed region in the time sequence, and detects a maximum contrast which is the maximum of the contrasts calculated in the time sequence.

Then, the actual displacement amount calculation section 21 calculates a value, which is obtained by subtracting the contrast of (the observed region of) the latest photographed image from the maximum contrast, as the amount of blur, and supplies the amount of blur as the actual amount of displacement to the determination section 23. Thereby, on the basis of the actual amount of displacement, the determination section 23 is able to determine whether the photographed image is in the desired photography condition in which the user shown in the photographed image is focused.

Further, the deformed image generation section 32 of the deformation processing section 30 generates an image, in which the user shown in the photographed image is further blurred, as a deformed image by filtering the photographed image (a region including the user shown in the image) through a low-pass filter of which the passband width is decreased on the basis of for example the amount of blur as the amount of deformation.

It should be noted that the above-mentioned methods do not limit: a method of determining whether the photographed image is in the desired photography condition in which the user shown in the photographed image is focused; and a method of generating the deformed image in which the user shown in the photographed image is further blurred.

Figure 6:
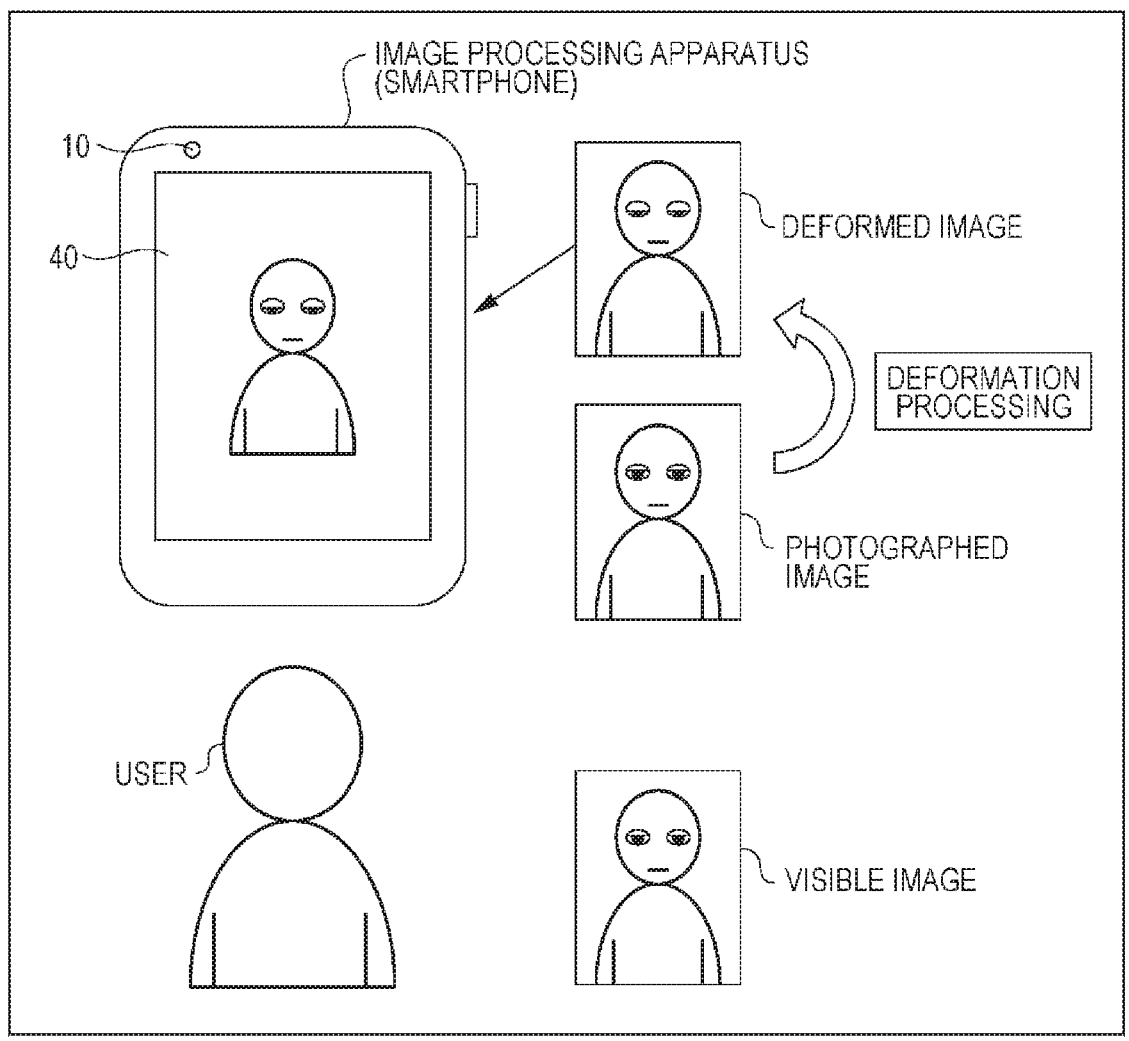
FIG. 6 is a diagram illustrating a third specific example of a deformed image.

FIG. 6 is a diagram illustrating a third specific example of a deformed image.

In FIG. 6, the expression of the user as the subject shown in the photographed image is an expression in which the eyelids are slightly closed.

Here, the desired photography condition may be a condition where the expression of the user shown in the photographed image is an expression in which the eyelids are normally open such that the entire iris is visible. In this case, the actual displacement amount calculation section 21 of the image determination section 20 calculates an amount of deviation in expression as the actual amount of displacement. The amount of deviation in expression is an amount of deviation between the expression of the user shown in the photographed image and the expression (predetermined expression) in which the eyelids are normally open.

Then, the determination section 23 of the image determination section 20 determines that the photographed image is not in the desired photography condition, on the basis of the amount of deviation in expression as the actual amount of displacement, and supplies the deviation determination information, which includes the amount of deviation in expression, to the deformation processing section 30.

On the basis of the amount of deviation in expression as the actual amount of displacement included in the deviation determination information obtained from the image determination section 20, the deformation amount calculation section 31 of the deformation processing section 30 calculates an amount of deviation in expression, which is obtained by increasing the magnitude of the amount of deviation in expression, as the amount of deformation.

Further, the deformed image generation section 32 of the deformation processing section 30 generates a deformed image which is obtained by deforming the photographed image supplied from the image acquisition section 10 by the amount of deformation, and the display section 40 displays the image.

That is, in the deformation processing section 30, the amount of deviation in expression, which is obtained by increasing the magnitude of the amount of deviation in expression as the actual amount of displacement, is set as the amount of deformation. On the basis of the amount of deformation, for example, an image, in which the expression of the user shown in the photographed image is an expression in which the eyelids are almost closed, is generated as a deformed image.

Then, the display section 40 displays the above-mentioned deformed image, that is, the image in which the expression of the user shown in the photographed image is the expression in which the eyelids are almost closed. Thereby, the user is able to recognize that the expression of the user shown in the photographed image is not the expression in which the eyelids are normally open and the photographed image is not an appropriate image (for the image processing section 50 as the image-related application).

In this case, while viewing the deformed image, the user adjusts the user's own self-expression by opening the eyelids. As a result, it is possible to obtain an appropriate photographed image, that is, a photographed image in which the expression of the user shown in the photographed image is the expression, in which the eyelids are normally open, and the entire iris is viewed (shown).

The determination section 23 is able to determine whether the photographed image is in the desired photography condition in which the expression of the user shown in the photographed image is the expression in which the eyelids are normally open such that the entire iris is visible, for example, in the following manner. The actual displacement amount calculation section 21 of the image determination section 20 calculates a covered condition (hereinafter referred to as an eyelid-covered condition), in which the eyelids of the user as the subject shown in the photographed image cover the irises, as the actual amount of displacement by applying an eyelid detection technique or the like to the photographed image.

Further, in the deformed image generation section 32 of the deformation processing section 30, for example, a series of photographed images, in which a user who is blinking is photographed, is retained as blink images, and a part of eyes of the latest photographed image is replaced by a part of eyes of the blink image in the eyelid-covered condition corresponding to the amount of deformation. Thereby, an image, in which a user who closes eyelids more tightly than the user shown in the photographed image is shown, can be generated as a deformed image.

It should be noted that the above-mentioned methods do not limit: a method of determining whether the photographed image is in the desired photography condition in which the expression of the user shown in the photographed image is the expression in which the eyelids are normally open such that the entire iris is visible; and a method of generating a deformed image in which the user who closes eyelids more tightly than the user shown in the photographed image is shown.

Figure 7:
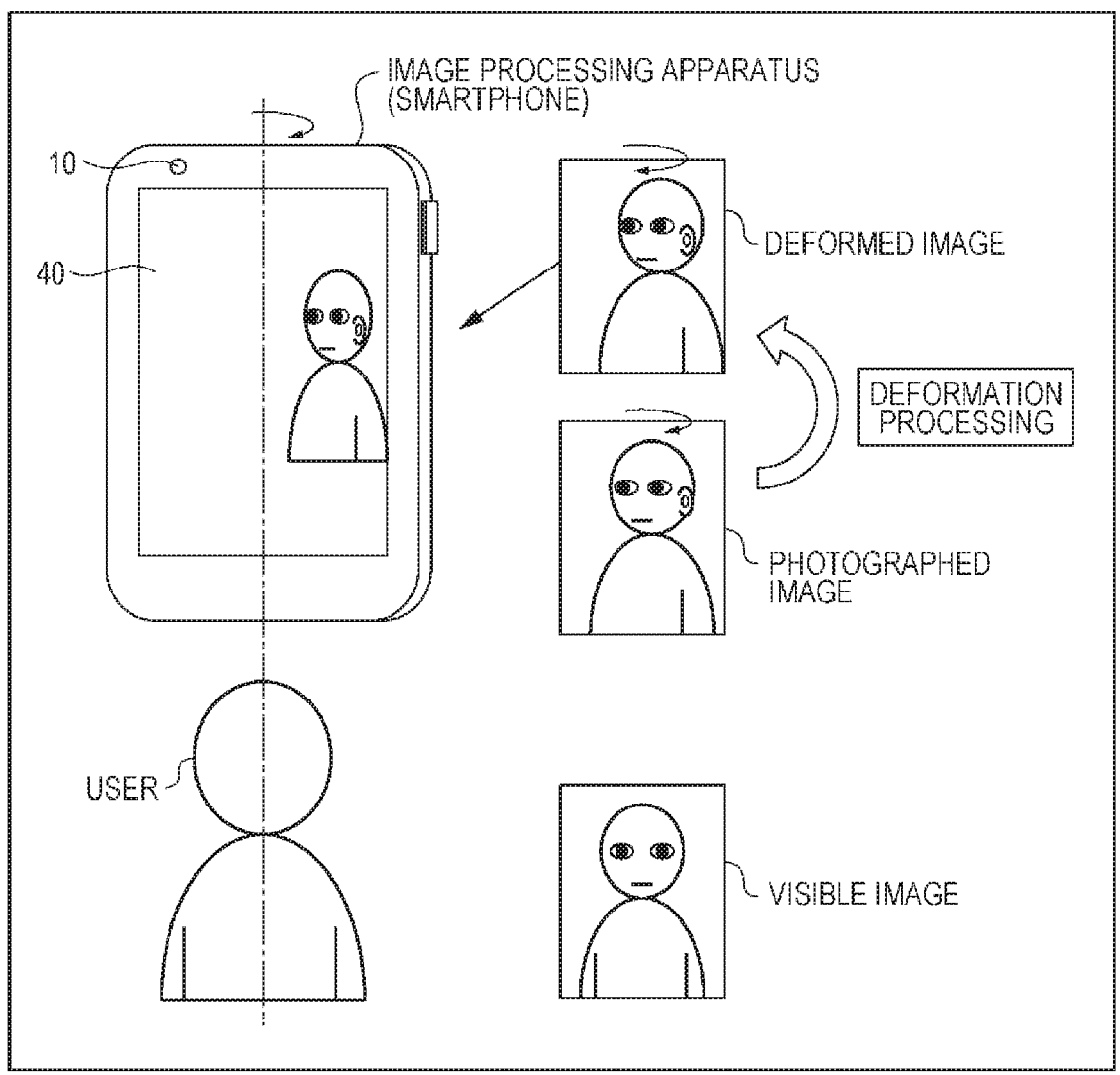
FIG. 7 is a diagram illustrating a fourth specific example of a deformed image.

FIG. 7 is a diagram illustrating a fourth specific example of a deformed image.

In FIG. 7, (the posture of) the user as the subject shown in the photographed image is not right opposite but tilted to the apparatus.

Here, the desired photography condition may be a condition in which the user shown in the photographed image is right opposite to the apparatus. In this case, the actual displacement amount calculation section 21 of the image determination section 20 calculates a tilt angle, at which the user shown in the photographed image is tilted to the right opposite direction, as the actual amount of displacement.

Then, the determination section 23 of the image determination section 20 determines that the photographed image is not in the desired photography condition, on the basis of the tilt angle as the actual amount of displacement. Then, the deviation determination information, which includes the tilt angle, is supplied to the deformation processing section 30.

On the basis of the tilt angle as the actual amount of displacement included in the deviation determination information obtained from the image determination section 20, the deformation amount calculation section 31 of the deformation processing section 30 calculates a tilt angle, which is obtained by increasing the magnitude of the tilt angle, as the amount of deformation.

Further, the deformed image generation section 32 of the deformation processing section 30 generates a deformed image which is obtained by deforming the photographed image supplied from the image acquisition section 10 by the amount of deformation, and the display section 40 displays the image.

That is, in the deformation processing section 30, the tilt angle, which is obtained by increasing the magnitude of the tilt angle as the actual amount of displacement, is set as the amount of deformation. Then, on the basis of the amount of deformation, an image, in which the user shown in the photographed image is further tilted to the right opposite direction, is generated as a deformed image.

Then, the display section 40 displays the above-mentioned deformed image, that is, the image in which the user shown in the photographed image is further tilted. Thereby, the user is able to recognize that the user shown in the photographed image is not right opposite to the apparatus and the photographed image is not an appropriate image (for the image processing section 50 as the image-related application).

In this case, while viewing the deformed image, the user adjusts, for example, the posture of the image processing apparatus as the smartphone by tilting the apparatus in a yaw direction, a roll direction, or a pitch direction. As a result, it is possible to obtain an appropriate photographed image, that is, a photographed image in which the user shown in the photographed image is right opposite (to (the image acquisition section 10 of) the image processing apparatus as the smartphone).

The determination section 23 is able to determine whether the photographed image is in the desired photography condition in which the user shown in the photographed image is right opposite to the apparatus, on the basis of the actual amount of displacement calculated, for example, in the following manner. In the actual displacement amount calculation section 21 of the image determination section 20, by applying the face authentication technology or the like to the photographed image, a direction of the face of the user as the subject shown in the photographed image is detected, and the tilt angle of the direction of the face relative to the right opposite direction is calculated as the actual amount of displacement.

Besides, for example, the image processing apparatus as the smartphone may have a gyro sensor or an acceleration sensor built thereinto. In this case, for example, the user performs an operation, which is necessary to acquire the posture (hereinafter referred to as a right opposite posture) of the smartphone from the gyro sensor or the acceleration sensor when the user shown in the photographed image is right opposite to the smartphone, as one of operations for calibration of the smartphone, thereby acquiring the right opposite posture in advance. Then, by calculating a difference between the current posture and the right opposite posture of the smartphone as the actual amount of displacement, on the basis of the actual amount of displacement, it is possible to determine whether the photographed image is in the desired photography condition in which the user shown in the photographed image is right opposite to the apparatus.

It should be noted that the above-mentioned method does not limit a method of determining whether the photographed image is in the desired photography condition in which the user shown in the photographed image is right opposite to the apparatus.

Figure 8:
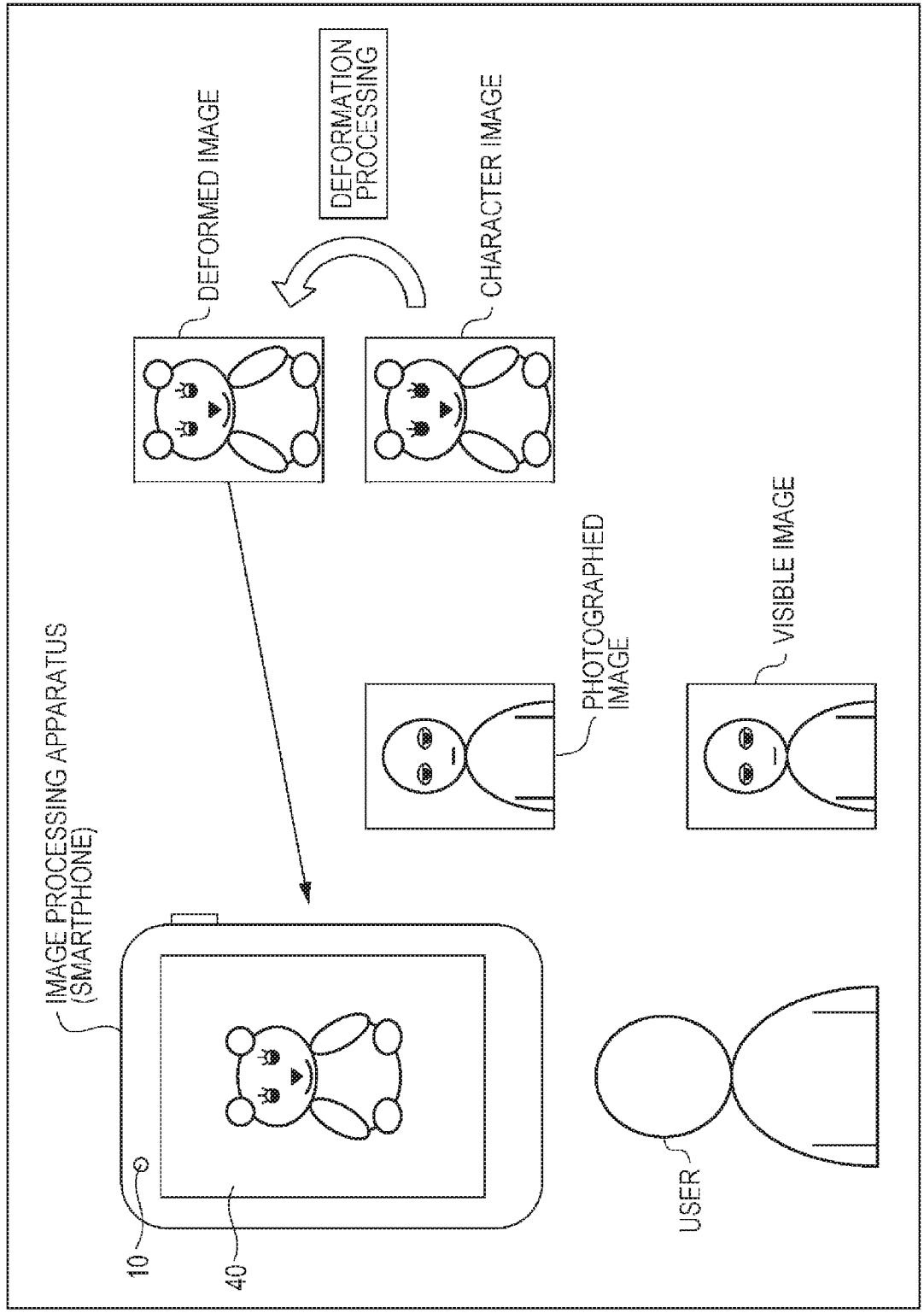
FIG. 8 is a diagram illustrating a fifth specific example of a deformed image.

FIG. 8 is a diagram illustrating a fifth specific example of a deformed image.

In FIG. 8, as in FIG. 6, the expression of the user as the subject shown in the photographed image is an expression in which the eyelids are slightly closed.

Here, the desired photography condition may be a condition where the expression of the user shown in the photographed image is an expression in which the eyelids are normally open such that the entire iris is visible. In this case, the actual displacement amount calculation section 21 of the image determination section 20 calculates an amount of deviation in expression as the actual amount of displacement. The amount of deviation in expression is an amount of deviation between the expression of the user shown in the photographed image and the expression in which the eyelids are normally open.

Then, the determination section 23 of the image determination section 20 determines that the photographed image is not in the desired photography condition, on the basis of the amount of deviation in expression as the actual amount of displacement, and supplies the deviation determination information, which includes the amount of deviation in expression, to the deformation processing section 30.

On the basis of the amount of deviation in expression as the actual amount of displacement included in the deviation determination information obtained from the image determination section 20, the deformation amount calculation section 31 of the deformation processing section 30 calculates an amount of deviation in expression, which is obtained by increasing the magnitude of the amount of deviation in expression, as the amount of deformation.

Further, the deformed image generation section 32 of the deformation processing section 30 generates a deformed image which is deformed on the basis of the amount of deformation, and the display section 40 displays the image.

Here, in FIG. 6, in the deformation processing section 30, the deformed image is generated using the photographed image. However, the deformed image may be generated not by using the photographed image but using a character such as a 3D (Dimension) avatar, a GUI (Graphical User Interface), and the other graphics images.

In FIG. 8, by using (a graphics image of) a bear character, a deformed image is generated.

That is, in the deformation processing section 30, the amount of deviation in expression, which is obtained by increasing the magnitude of the amount of deviation in expression, is set as the amount of deformation. On the basis of the amount of deformation, an image, in which the expression of the bear character is an expression in which the eyelids of the bear are closed more tightly than that of the user shown in the photographed image, is generated as a deformed image.

Then, the display section 40 displays the above-mentioned deformed image, that is, the image in which the expression of the bear character is an expression in which the eyelids of the bear are closed more tightly than that of the user shown in the photographed image. Thereby, the user is able to recognize that the expression of the user shown in the photographed image is not the expression in which the eyelids are normally open and the photographed image is not an appropriate image (for the image processing section 50 as the image-related application).

In this case, while viewing the deformed image, the user adjusts the user's own self-expression by opening the eyelids. As a result, it is possible to obtain an appropriate photographed image, that is, a photographed image in which the expression of the user shown in the photographed image is the expression, in which the eyelids are normally open, and the entire iris is viewed (shown).

In addition, a deformed image, which is generated using a graphics image such as the bear character of FIG. 8 suggestive of a person (user) to a certain extent, can also be applied to not only the case of FIG. 6 but also cases of FIGS. 4, 5, and 7 and the like.

Further, as the graphics image used to generate the deformed image, an image other than the graphics image such as the bear character of FIG. 8 suggestive of a person may be employed.

Figure 9:
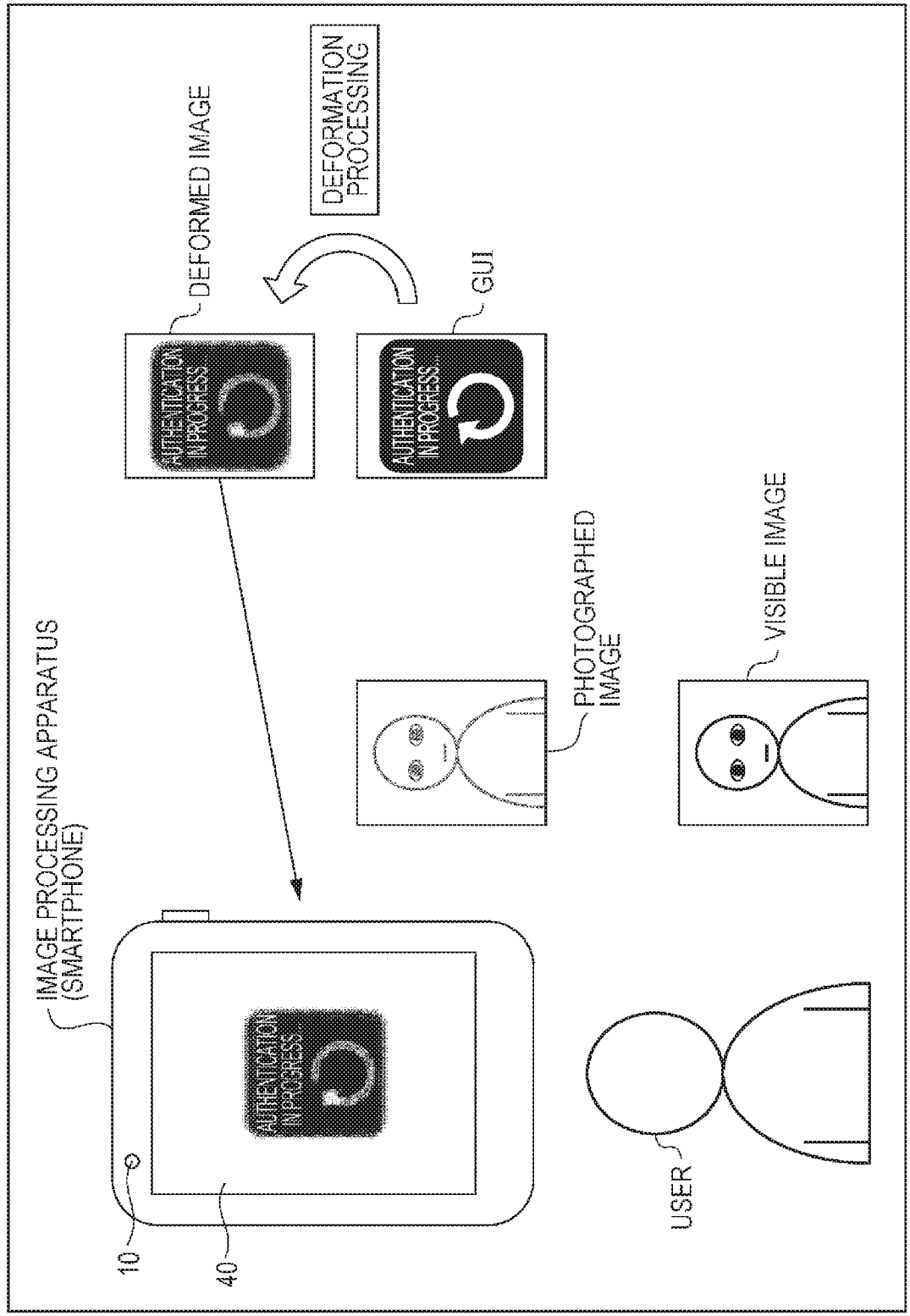
FIG. 9 is a diagram illustrating a sixth specific example of a deformed image.

FIG. 9 is a diagram illustrating a sixth specific example of a deformed image.

In FIG. 9, as in FIG. 5, the user as the subject shown in the photographed image is slightly blurred.

Here, when the desired photography condition is a condition in which the user shown in the photographed image is focused, the actual displacement amount calculation section 21 of the image determination section 20 calculates an amount of blur, which indicates a degree of defocus of the user shown in the photographed image, as the actual amount of displacement.

Then, the determination section 23 of the image determination section 20 determines that the photographed image is not in the desired photography condition, on the basis of the amount of blur as the actual amount of displacement, and supplies the deviation determination information including the amount of blur to the deformation processing section 30.

On the basis of the amount of blur as the actual amount of displacement included in the deviation determination information obtained from the image determination section 20, the deformation amount calculation section 31 of the deformation processing section 30 calculates an amount of blur, which is obtained by increasing the magnitude of the amount of blur, as the amount of deformation.

Further, the deformed image generation section 32 of the deformation processing section 30 generates a deformed image which is deformed on the basis of the amount of deformation, and the display section 40 displays the image.

Here, in FIG. 5, in the deformation processing section 30, the deformed image is generated using the photographed image. However, as described above, the deformed image may be generated not by using the photographed image but using a graphics image.

In FIG. 9, for example, the image processing section 50 as the image-related application using the photographed image may be an authentication device that performs iris authentication or face authentication. In this case, the deformed image is generated using the GUI (hereinafter referred to as an authentication-in-progress GUI) in which a text of "authentication in progress" is displayed while the authentication device is performing authentication.

That is, in the deformation processing section 30, an amount of blur, which is obtained by increasing the magnitude of the amount of blur as the actual amount of displacement, is set as the amount of deformation. Then, on the basis of the amount of deformation, an image, in which the authentication-in-progress GUI is more blurred than the user shown in the photographed image, is generated as a deformed image.

Then, the display section 40 displays the above-mentioned deformed image, that is, the image in which the authentication-in-progress GUI is more blurred than the user shown in the photographed image. Thereby, the user is able to recognize that the user shown in the photographed image is defocused and the photographed image is not an appropriate image (for the image processing section 50 as the image-related application).

In this case, while viewing the deformed image, the user adjusts the distance between the user themself and the image processing apparatus as the smartphone to an appropriate distance so as to correct the amount of blur as the amount of deformation applied to the deformed image. As a result, it is possible to obtain an appropriate photographed image, that is, a photographed image in which the user shown in the photographed image is focused.

Figure 10:
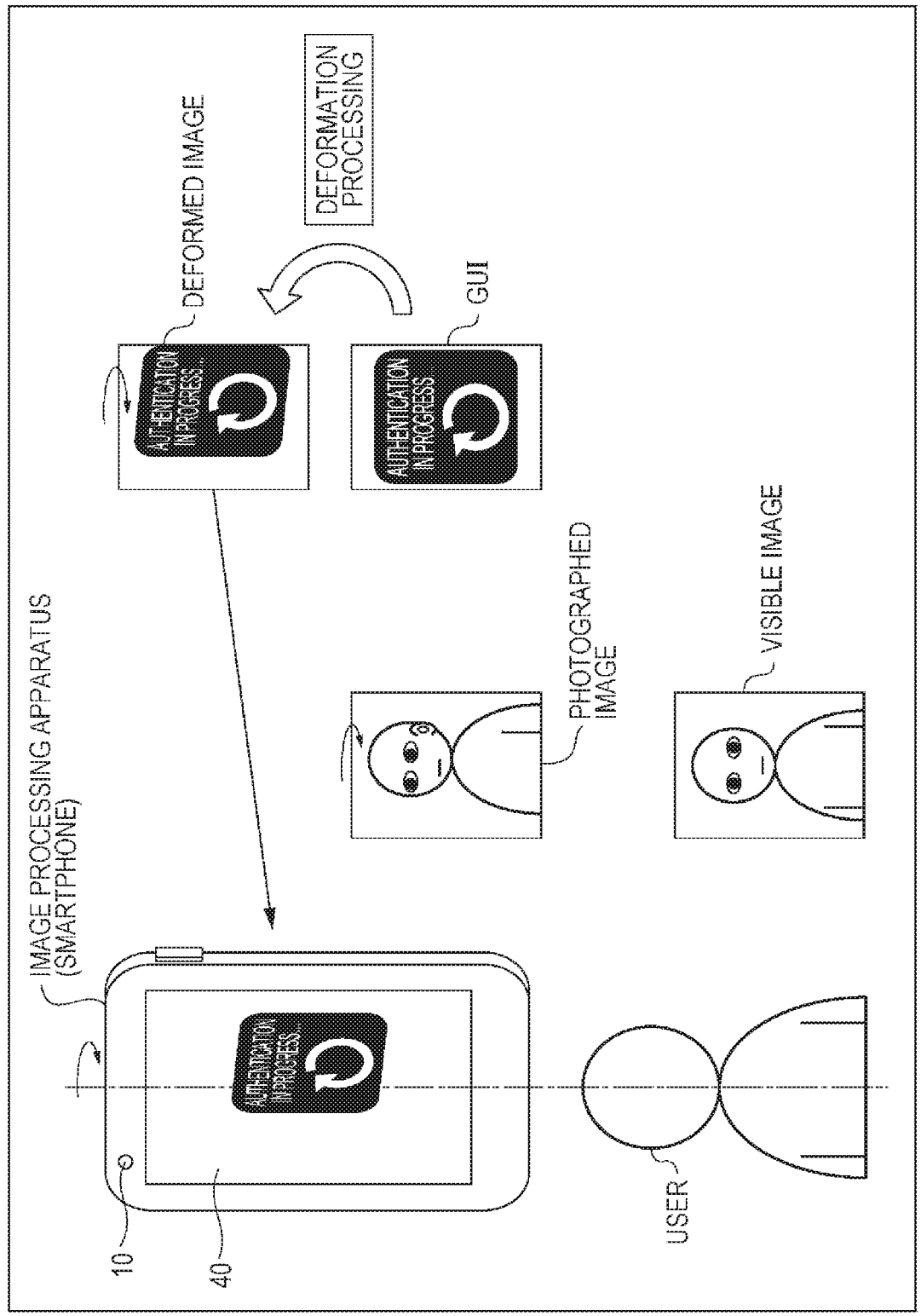
FIG. 10 is a diagram illustrating a seventh specific example of a deformed image.

FIG. 10 is a diagram illustrating a seventh specific example of a deformed image.

In FIG. 10, as in FIG. 7, (the posture of) the user as the subject shown in the photographed image is not right opposite but tilted to the apparatus.

Here, the desired photography condition may be a condition in which the user shown in the photographed image is right opposite to the apparatus. In this case, the actual displacement amount calculation section 21 of the image determination section 20 calculates a tilt angle, at which the user shown in the photographed image is tilted to the right opposite direction, as the actual amount of displacement.

Then, the determination section 23 of the image determination section 20 determines that the photographed image is not in the desired photography condition, on the basis of the tilt angle as the actual amount of displacement. Then, the deviation determination information, which includes the tilt angle, is supplied to the deformation processing section 30.

On the basis of the tilt angle as the actual amount of displacement included in the deviation determination information obtained from the image determination section 20, the deformation amount calculation section 31 of the deformation processing section 30 calculates a tilt angle, which is obtained by increasing the magnitude of the tilt angle, as the amount of deformation.

Further, the deformed image generation section 32 of the deformation processing section 30 generates a deformed image which is deformed on the basis of the amount of deformation, and the display section 40 displays the image.

Here, in FIG. 7, in the deformation processing section 30, the deformed image is generated using the photographed image. However, in FIG. 10, for example, as in FIG. 9, the deformed image is generated not by using the photographed image but using an authentication-in-progress GUI as the graphics image.

That is, in the deformation processing section 30, the tilt angle, which is obtained by increasing the magnitude of the tilt angle as the actual amount of displacement, is set as the amount of deformation. Then, on the basis of the amount of deformation, an image, in which the authentication-in-progress GUI is tilted, is generated as a deformed image.

Then, the display section 40 displays the above-mentioned deformed image, that is, the image in which the authentication-in-progress GUI is more tilted than the user shown in the photographed image. Thereby, the user is able to recognize that the user shown in the photographed image is not right opposite to the apparatus and the photographed image is not an appropriate image (for the image processing section 50 as the image-related application).

In this case, while viewing the deformed image, the user adjusts the posture of the image processing apparatus as the smartphone by tilting the apparatus in a yaw direction, a roll direction, or a pitch direction. As a result, it is possible to obtain an appropriate photographed image, that is, a photographed image in which the user shown in the photographed image is right opposite (to (the image acquisition section 10 of) the image processing apparatus as the smartphone).

In addition, it is difficult for the deformed image, which is generated using the graphics image that is not suggestive of a person like the authentication-in-progress GUIs of FIGS. 9 and 10, to serve as an image in which an expression of a person (user) is deformed. Therefore, the deformed image can be applied to the cases of FIGS. 4, 5, and 7 where an image other than the expression of the person is deformed.

<Calculation of Amount of Deformation>

FIGS. 11A to 11D are diagrams illustrating examples of the method of calculating the amount of deformation through the deformation amount calculation section 31 of FIG. 1.

The deformation amount calculation section 31 is able to calculate the amount of deformation, relative to the actual amount of displacement included in the deviation determination information obtained from the determination section 23, on the basis of, for example, a predetermined interpolation function.

Figure 11A:
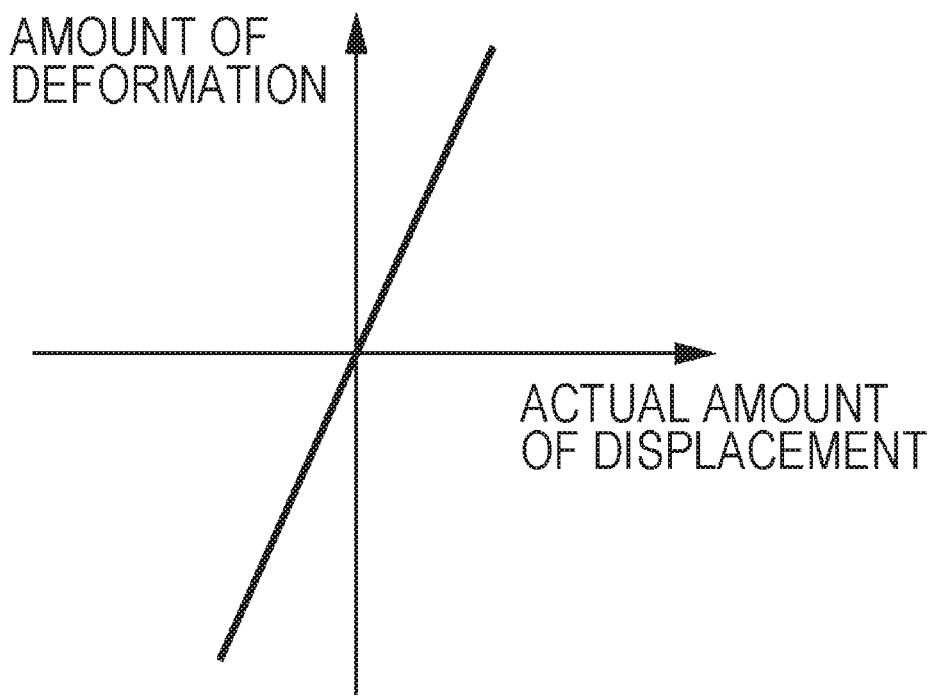
FIG. 11A is a diagram illustrating an example of a method of calculating an amount of deformation through a deformation amount calculation section.

FIG. 11A shows an example of a first interpolation function for calculating the amount of deformation.

The first interpolation function of FIG. 11A is a linear interpolation function through which a linear output value is obtained in response to an input value. Through the corresponding first interpolation function, the amount of deformation, which has a value of a predetermined number (>1) times the actual amount of displacement is calculated.

Figure 11B:
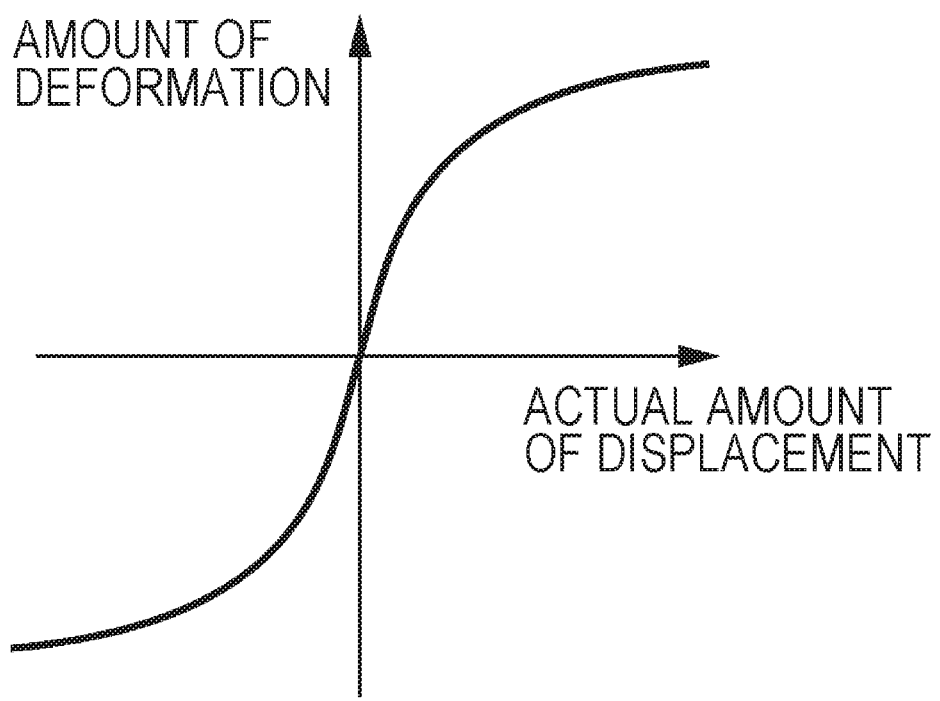
FIG. 11B is a diagram illustrating an example of the method of calculating the amount of deformation through the deformation amount calculation section.

FIG. 11B shows an example of a second interpolation function for calculating the amount of deformation.

The second interpolation function of FIG. 11B is a spline interpolation function through which a non-linear output value is obtained in response to an input value. Through the corresponding second interpolation function, an amount of deformation with a value larger than the value in the case of the first interpolation function as a linear function is calculated for an actual amount of displacement with a small value, and an amount of deformation with a value converging to a predetermined value is calculated for an actual amount of displacement with a large value.

Consequently, according to the amount of deformation calculated by the second interpolation function, for example, as shown in FIG. 4, the amount of positional deviation of the position of the user from the position on the central line may be small relative to the photographed image in which the position of the user is deviated (to the right side) from the position on the central line. In this case, a deformed image which is deformed such that the amount of positional deviation is increased (emphasized), that is, a deformed image, in which the position of the user is further greatly deviated, is generated.

In contrast, the amount of positional deviation may be large. In this case, a deformed image, which is deformed such that the amount of positional deviation is small (which is less deformed), that is, for example, a deformed image, in which the position of the user is deviated by an amount substantially the same as the amount of positional deviation, is generated.

According to the amount of deformation calculated by the above-mentioned second interpolation function, when the amount of positional deviation is large, in the deformed image, it is possible to prevent the user from being out of the image frame, or it is possible to reduce the degree by which the user is out of the image frame.

Figure 11C:
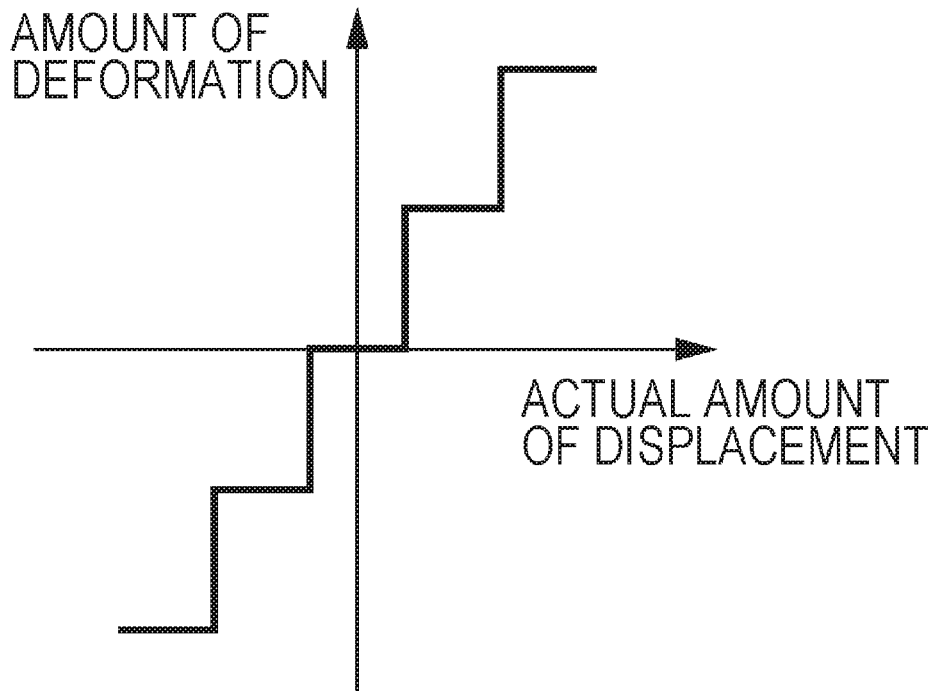
FIG. 11C is a diagram illustrating an example of the method of calculating the amount of deformation through the deformation amount calculation section.

FIG. 11C shows an example of a third interpolation function for calculating the amount of deformation.

The third interpolation function of FIG. 11C is a constant interpolation function through which a non-linear output value is obtained in response to an input value. Through the corresponding third interpolation function, an amount of deformation, which is changed stepwise, is calculated for the actual amount of displacement.

In the third interpolation function, even when the actual amount of displacement is slightly changed, the amount of deformation is not changed. Hence, the function is effective, for example, when it is not necessary for the change in the actual amount of displacement to be sequentially reflected as the change in the deformed image.

For example, as shown in FIG. 8, the amount of deviation in expression, in which the expression of the user shown in the photographed image is deviated from the expression in which the eyelids are normally open, is calculated as the actual amount of displacement. On the basis of the amount of deformation obtained from the actual amount of displacement, the image, in which the expression of the bear character is an expression in which the eyelids of the bear are closed more tightly than that of the user shown in the photographed image, is generated as the deformed image. In this case, the third interpolation function can be used in the calculation of the amount of deformation.

That is, for example, as the (graphics) images of the bear character, there are provided three kinds of images of an image in which the eyelids are completely open, an image in which the eyelids are closed (open) halfway, and an image in which the eyelids are completely closed. On the basis of the amount of deformation which is changed stepwise from the actual amount of displacement, the image to be generated as a deformed image can be selected from the three kinds of images mentioned above.

In this case, it is possible to reduce a memory area for retaining the character image, or it is possible to reduce costs in processing of displaying the character image on the display section 40.

Figure 11D:
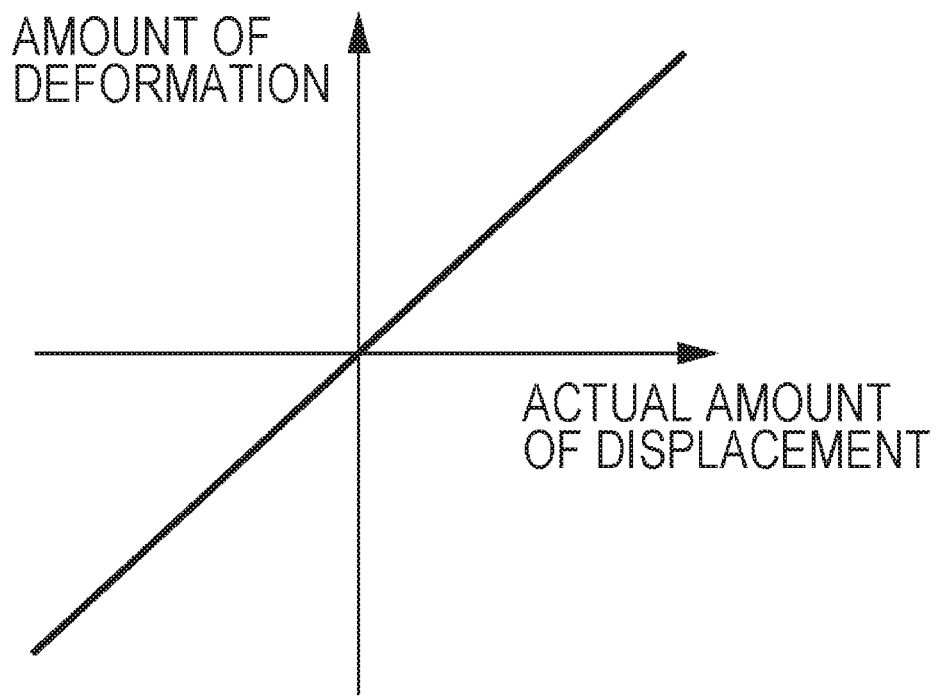
FIG. 11D is a diagram illustrating an example of the method of calculating the amount of deformation through the deformation amount calculation section.

FIG. 11D shows an example of a fourth interpolation function for calculating the amount of deformation.

The fourth interpolation function of FIG. 11D is a linear interpolation function similarly to the first interpolation function of FIG. 11A, but is a function of calculating the actual amount of displacement as the amount of deformation as it is.

The fourth interpolation function of FIG. 11D sets the amount of displacement as the amount of deformation as it is, and can be used when an image, which is not deformed, is displayed as a live view image on the display section 40 (when any deformation is not intended to be performed).

In the deformation mode, when the amount of deformation is calculated through the fourth interpolation function and the deformed image is generated using the photographed image, in a similar manner to the normal mode, the display section 40 displays the photographed image, which is photographed by the image acquisition section 10, as the live view image as it is.

In addition, it is possible to use a function other than the interpolation functions of FIGS. 11A to 11D in calculation of the amount of deformation using the actual amount of displacement.

As described above, in the image processing apparatus of FIG. 1 as the smartphone, an image is acquired through photography, and the acquired photographed image (acquired image) is deviated from the desired photography condition. In this case, the deformed image, in which the deviation from the desired photography condition is deformed, is generated. Therefore, it is possible to easily guide a user to achieve a desired photography condition.

That is, the user naturally performs an operation (action) for correcting the deviation of the photographed image from the desired photography condition while viewing the deformed image even when not knowing the desired photography condition (for example, the user shown in the photographed image is right opposite to the apparatus). As a result, it is possible to easily obtain the photographed image of the desired photography condition.

Accordingly, when the image processing section 50 as the image-related application using the photographed image is for example an iris authentication device that performs iris authentication, it is possible to easily obtain the photographed image appropriate for iris authentication.

Here, in the iris authentication device, for example, as disclosed in description of Patent Publication No. 3307936 and the like, generally, an eye image, which is an image of the user's eyes, is photographed by a camera, an iris part of the eye image is cut out, and features of the iris are extracted (iris data) and then coincide with features in iris data, which is registered in the iris authentication device in advance, by cross-checking the iris data. In this case, the user is specified (authenticated) as themself.

In the corresponding iris authentication device, in order to maintain the authentication accuracy, it is necessary to photograph an eye image of the eyes with high accuracy and in an appropriate condition. Hence, the eye image of the user is displayed with high resolution on the display screen, and the position of the eyes is adjusted for the user so as to be in a certain rectangular region in the display screen. Thereby, the eye image necessary for iris authentication is photographed.

However, it is difficult for the user, who is bad at the operation of iris authentication, to adjust the position of the eyes in the rectangular region in the display screen with high resolution, and it may take a long time to adjust the position of the eyes.

Further, even when the position of the eyes is adjusted, the eyes may be defocused, the eye image may be blurred, the closed eyelids may cover a part or the entirety of the irises of the eyes, or the eyes may be photographed in a state where the eyes are not right opposite but tilted to the camera. In this case, it is difficult to obtain the eye image appropriate for iris authentication of the iris authentication device.

Furthermore, in the description of the above-mentioned PTL 1, the following procedure is repeated. First, regarding the eye image with low resolution, the iris authentication device determines whether or not the eyes shown in the eye image are in the certain rectangular region in the display screen. If the eyes shown in the eye image are in the rectangular region, the eye image is changed from the low resolution eye image to a high resolution eye image, and is displayed on the display screen, and the position of the eyes is adjusted for the user so as to be in the rectangular region in the display screen.

However, in the corresponding iris authentication device, whenever the resolution of the eye image is changed, the user has to adjust the position of the eyes in the rectangular region in the display screen. Even when the position of the eyes is adjusted, as described above, the eye image may be defocused.

In contrast, in the image processing apparatus of FIG. 1 as the smartphone, as described above, it is possible to easily guide a user to achieve the desired photography condition. Therefore, it is possible to easily obtain the photographed image appropriate for iris authentication.

Further, in the image processing apparatus of FIG. 1 as the smartphone, it is possible to generate the deformed image not by using the photographed image in which the user is shown but using the graphics image such as the predetermined character or the GUI. Therefore, when the image processing section 50 as the image-related application is for example an iris authentication device, it is possible to prevent biological information from being secretly photographed, and it is possible to prevent the user from feeling uncomfortable due to displaying the eye image in an enlarged manner.

That is, when not the graphics image but for example the photographed image in which the user is shown is displayed, the biological information, such as (an image of) the iris of the user shown in the photographed image, may be secretly photographed by somebody else, and the user may feel uncomfortable due to the image of the eyes which are shown in the photographed image in an enlarged manner.

When the deformed image is generated not by using the photographed image in which the user is shown but using the graphics image such as the predetermined character or the GUI, it is possible to prevent the above-mentioned biological information from being secretly photographed and to prevent the user from feeling uncomfortable.

Here, as the image-related application using the photographed image, for example, as described above, there are an authentication device that performs iris authentication and the like and a photography assistance device that helps the macro photography and the like.

In the authentication device, as the desired photography condition, there may be all the following conditions: the position of the user shown in the photographed image is the position on the central line; the user shown in the photographed image is focused; the expression of the user shown in the photographed image is the expression in which the eyelids are open such that the entire iris is viewed; and the user shown in the photographed image is right opposite to the apparatus.

Further, in the photography assistance device, when assistance of the macro photography is performed, as the desired photography condition, there may be the following conditions: the (large) subject shown in the photographed image is focused; the angle of view of the subject shown in the photographed image is in a predetermined range (in a range from a predetermined minimum value to a predetermined maximum value); and the like.

It should be noted that the present technology can be applied to not only the photography function apparatuses having the photography function such as a digital camera, a smartphone, a mobile phone, a tablet, and a PC but also all the image-related applications using the image which is photographed by the photographing apparatus such as a digital camera, regardless of whether or not there is provided the photography function.

That is, in the present technology, for example, the user is photographed, and the user shown in the image obtained by the photography is displayed on a TV (television) or the like. In addition, in a game which is played in response to action of a user, the deformed image, in which deviation from an appropriate size or an appropriate position of the user shown in the photographed image is deformed, is displayed. Thereby, it is possible to guide the user such that the user is shown the appropriate size at the appropriate position in the game.

Further, the present technology can be applied to, for example, an application that guides a user to appropriately wear (put on) so-called wearable glasses by displaying the deformed image, in which the deviation from the appropriate image to be photographed by a camera is deformed, on the wearable glasses which are a glasses type having a small-sized camera mounted thereon.

Furthermore, the present technology can be applied to, for example, an application that prompts a user to correct a tilt of a digital camera by notifying the user that the digital camera is tilted in a way of displaying a deformed image in which the tilt is deformed when the photographed image is tilted by the tilt of the digital camera in the yaw direction, the roll direction, or the pitch direction, in the photography of the digital camera.

Here, for example, in the smartphone, cameras may be provided on both of a display surface, which performs so-called main display, and a surface opposite to the display surface. However, the present technology can be applied to both of an image, which is photographed by a camera (front camera) provided on the display surface, and an image which is photographed by a camera (back camera) provided on the surface opposite to the display surface.

Further, the present technology can be applied to both of a still image and a moving image.

<Description of Computer Employing the Present Technology>

Next, the series of processes described above may be executed by hardware or may be executed by software. When the series of processes is executed by software, a program constituting the software is installed in a general-purpose computer or the like.

Figure 12:
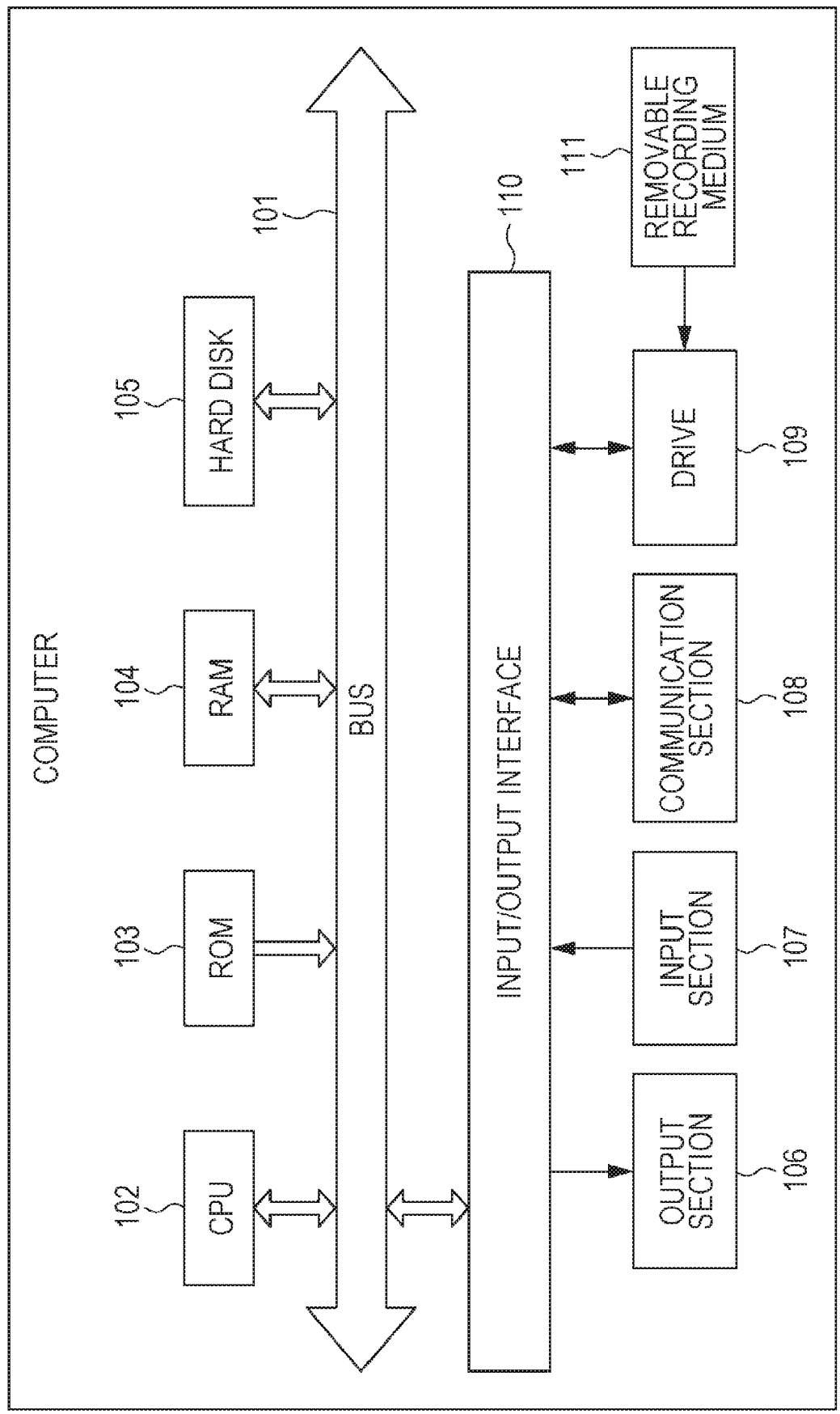
FIG. 12 is a block diagram illustrating an exemplary configuration of a computer according to an embodiment of the present technology.

Thus, FIG. 12 shows a configuration example of an embodiment of a computer in which a program that executes the series of processes described above is installed.

The program can be recorded in advance in a hard disk 105 or a ROM 103 serving as a recording medium built into a computer.

Alternatively, the program can be stored (recorded) in a removable recording medium 111. Such a removable recording medium 111 can be provided as so-called package software. Here, examples of the removable recording medium 111 include a flexible disk, a compact disc read only memory (CD-ROM), a magneto optical (MO) disk, a digital versatile disc (DVD), a magnetic disk, a semiconductor memory, and the like.

It should be noted that the program can be, as well as installed in the computer from the removable recording medium 111 as described above, downloaded to the computer through a communication network or a broadcast network, and installed in the built-in hard disk 105. That is, the program can be transferred to the computer from a download site in a wireless fashion through a satellite for digital satellite broadcasting or transferred to the computer in a wired fashion through a network such as a local area network (LAN) or the Internet.

The computer has a central processing unit (CPU) 102 built thereinto. The CPU 102 is connected to an input/output interface 110 through a bus 101.

When a command is input by a user performing an operation or the like using an input unit 107 through the input/output interface 110, the CPU 102 executes a program stored in the read only memory (ROM) 103 in response to the command. Alternatively, the CPU 102 loads a program, which is stored in the hard disk 105, on a random access memory (RAM) 104, and executes the program. Thereby, the CPU 102 performs the processes according to the flowcharts described above or the processes performed by the configuration of the block diagrams described above. Then, the CPU 102, for example, outputs the processing result from an output unit 106, transmits the processing result from the communication unit 108, or records the processing result in the hard disk 105, through the input/output interface 110, as necessary.

It should be noted that the input section 107 includes a keyboard, a mouse, a microphone, and the like. Further, the output section 106 includes a liquid crystal display (LCD), a speaker, and the like.

Here, in the present description, the processes, which a program causes a computer to perform, may not necessarily be performed in time sequence in the order described in the flowcharts. That is, the processes, which a program causes a computer to perform, also include processes executed in parallel or individually (for example, parallel processes or object-based processes).

Further, the program may be processed by a single computer (processor) or may be processed in a distributed fashion by a plurality of computers. Furthermore, the program may be transferred to a remote computer and executed by the computer.

Furthermore, in the present description, the system means an assembly of a plurality of elements (devices, modules (components), and the like), regardless of whether or not all the elements are in the same casing. Consequently, the system is both of a plurality of devices, which are housed in separate casings and are connected through a network, and a single device in which a plurality of modules is housed in a single casing.

It should be noted that embodiments of the present technology are not limited to the above-mentioned embodiment, and may be modified into various forms without departing from the technical scope of the present technology.

For example, in the present technology, it is possible to adopt a cloud computing configuration in which a single function is shared and cooperatively processed by a plurality of devices through a network.

Further, the steps described in the above-mentioned flowchart are not only executed by a single device, but may also be shared and executed by a plurality of devices.

Furthermore, when a plurality of processes is included in a single step, the plurality of processes included in the single step is not only executed by a single device, but may also be shared and executed by a plurality of devices.

It should be noted that the present technology may have the following configurations.

(1) An information processing system, comprising: circuitry configured to input an image, determine whether the image deviates from at least one desired image capture condition, identify a deviation amount of the image relative to the at least one desired image capture condition, and generate a deformed image in which a deviation from the at least one desired image capture condition is increased by a predetermined amount over the deviation amount identified.

(2) The information processing system of (1), wherein the circuitry is further configured to cause display of the deformed image.

(3) The information processing system of any one of (1) to (2), wherein the at least one desired capture condition includes an alignment of a subject in the image with a central line of the image, and the deviation amount is a difference between the central line of the image and a central line of the subject.

(4) The information processing system of any one of (1) to (3), wherein the at least one desired capture condition includes a focus level of the image, and the deviation amount is an amount of blur detected in the image.

(5) The information processing system of any one of (1) to (4), wherein the at least one desired capture condition includes a desired orientation angle of a subject in the image with respect to an image capture device that captures the image, and the deviation amount is the difference between an actual tilt angle of the subject and the desired orientation angle.

(6) The information processing system of any one of (1) to (5), wherein the at least one desired capture condition includes a desired eye opening state of a subject in the image, and the deviation amount is a difference between an actual eye opening state of the subject and the desired eye opening state.

(7) The information processing system of any one of (1) to (6), wherein the deformed image includes a graphical icon arranged in the deformed image according to the deviation from the at least one desired image capture condition increased by the predetermined amount over the deviation amount, the graphical icon replacing a subject of the image in the deformed image.

(8) The information processing system of (7), wherein the graphical icon is part of a graphical user interface.

(9) The information processing system of (8), wherein the graphical icon includes text.

(10) The information processing system of (9), wherein the graphical user interface corresponds to a face authentication process.

(11) The information processing system of (10), wherein the face authentication process includes an authentication process for an iris of an eye.

(12) The information processing system of any one of (1) to (11), wherein the deformed image includes a character image arranged in the deformed image according to the deviation from the at least one desired image capture condition increased by the predetermined amount over the deviation amount, the character image replacing a subject of the image in the deformed image.

(13) The information processing system of any one of (1) to (12), wherein the circuitry determines the predetermined amount with which the deviation amount is increased using an interpolation function.

(14) The information processing system of (13), wherein the interpolation function is a linear interpolation function.

(15) The information processing system of any one of (13) to (14), wherein the interpolation function is a spline interpolation function.

(16) The information processing system of any one of (13) to (15), wherein the interpolation function is a non-linear step-wise interpolation function.

(17) The information processing system of any one of (1) to (16), wherein the predetermined amount with which the deviation amount is increased is zero.

(18) The information processing system of any one of (1) to (17), wherein the information processing system is a smart phone.

(19) An information processing method, comprising: inputting an image using circuitry; determining, using the circuitry, whether the image deviates from at least one desired image capture condition; identifying, using the circuitry, a deviation amount of the image relative to the at least one desired image capture condition; and generating, using the circuitry, a deformed image in which a deviation from the at least one desired image capture condition is increased by a predetermined amount over the deviation amount identified.

(20) A non-transitory computer-readable medium encoded with computer-readable instructions thereon that, when executed by a computer, cause the computer to perform a method comprising: inputting an image; determining whether the image deviates from at least one desired image capture condition; identifying a deviation amount of the image relative to the at least one desired image capture condition; and generating a deformed image in which a deviation from the at least one desired image capture condition is increased by a predetermined amount over the deviation amount identified.

(21) An image processing apparatus including: an image generation section that generates a greatly deviated image, in which a deviation from a desired photography condition is increased, when an acquired image acquired by an image acquisition section is deviated from the desired photography condition.

(22) The image processing apparatus according to (21), in which when a position of a subject shown in the acquired image is deviated from a predetermined position, the image generation section generates the greatly deviated image in which a positional deviation of the subject is increased.

(23) The image processing apparatus according to (21), in which when a subject shown in the acquired image is blurred, the image generation section generates the greatly deviated image in which a degree of blurring of the subject is increased.

(24) The image processing apparatus according to (21), in which when an expression of a subject shown in the acquired image is deviated from a predetermined expression, the image generation section generates the greatly deviated image in which a deviation in the expression of the subject is increased.

(25) The image processing apparatus according to (21), in which when a subject shown in the acquired image is not right opposite but tilted to the apparatus, the image generation section generates the greatly deviated image in which a tilt of the subject is increased.

(26) The image processing apparatus according to any one of (21) to (25), in which the image generation section generates the greatly deviated image using the acquired image.

(27) The image processing apparatus according to any one of (21) to (25), in which the image generation section generates the greatly deviated image using a predetermined graphics image.

(28) The image processing apparatus according to any one of (21) to (27), further including: an actual displacement amount calculation section that calculates an actual amount of displacement which is an amount of deviation between the desired photography condition and a condition of the acquired image acquired by the image acquisition section; and a great deviation amount calculation section that calculates an amount of great deviation which is an amount of deviation of the greatly deviated image on the basis of the actual amount of displacement, in which the image generation section generates the greatly deviated image, in which the deviation from the desired photography condition is increased, in accordance with the amount of great deviation, and in which the amount of great deviation is linearly or non-linearly changed relative to the actual amount of displacement.

(29) The image processing apparatus according to any one of (21) to (28), further including: the image acquisition section; and a display section that displays the greatly deviated image.

(30) An image processing method including: generating a greatly deviated image, in which a deviation from a desired photography condition is increased, when an acquired image acquired by an image acquisition section is deviated from the desired photography condition.

(31) A program for causing a computer to function as: an image generation section that generates a greatly deviated image, in which a deviation from a desired photography condition is increased, when an acquired image acquired by an image acquisition section is deviated from the desired photography condition.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

10 IMAGE ACQUISITION SECTION
20 IMAGE DETERMINATION SECTION
21 ACTUAL DISPLACEMENT AMOUNT CALCULATION SECTION

22 DESIRED PHOTOGRAPHY CONDITION SETTING SECTION
23 DETERMINATION SECTION
30 DEFORMATION PROCESSING SECTION
31 DEFORMATION AMOUNT CALCULATION SECTION
32 DEFORMED IMAGE GENERATION SECTION
40 DISPLAY SECTION
50 IMAGE PROCESSING SECTION
60 SAVING SECTION
70 OPERATION SECTION
80 CONTROL SECTION
101 BUS
102 CPU
103 ROM
104 RAM
105 HARD DISK
106 OUTPUT SECTION
107 INPUT SECTION
108 COMMUNICATION SECTION
109 DRIVE
110 INPUT/OUTPUT INTERFACE
111 REMOVABLE RECORDING MEDIUM

The invention claimed is:

1. An information processing system, comprising:
  circuitry configured to:
    receive an image associated with at least one image capture condition for a face authentication process;
    determine a blur amount of the image, wherein the blur amount is a degree of defocus of a subject in the image;
    identify a deviation amount of the image based on the blur amount, wherein the deviation amount indicates a deviation of the image from the at least one image capture condition;
    determine a deformation amount based on the deviation amount;
    control display of an authentication-in-progress graphical user interface for the face authentication process;
    increase a blur amount of a text of the authentication-in-progress graphical user interface based on the deformation amount;
    generate a deformed image in which the increase of the blur amount of the text of the authentication-in-progress graphical user interface, from the at least one image capture condition, is by the deformation amount, wherein the deformed image includes the authentication-in-progress graphical user interface that replaces the subject in the image; and
    control display of the deformed image in which the blur amount of the text of the authentication-in-progress graphical user interface is increased by the deformation amount.

2. The information processing system according to claim 1, wherein the circuitry is further configured to:
  identify the deviation amount of the image based on a tilt angle of the subject in the image; and
  increase a tilt angle of the authentication-in-progress graphical user interface based on the deviation amount.

3. The information processing system according to claim 1, wherein
  the at least one image capture condition further includes an alignment of the subject in the image with a first central line of the image, and
  the circuitry is further configured to identify the deviation amount based on a difference between the first central line of the image and a second central line of the subject.

4. The information processing system according to claim 1, wherein
  the at least one image capture condition further includes a focus level of the image.

5. The information processing system according to claim 1, further comprising an image capture device configured to capture the image, wherein
  the at least one image capture condition further includes an orientation angle of the subject in the image with respect to the image capture device, and
  the circuitry is further configured to identify the deviation amount based on a difference between a tilt angle of the subject and the orientation angle.

6. The information processing system according to claim 1, wherein
  the at least one image capture condition further includes a first eye opening state of the subject in the image, and
  the circuitry is further configured to:
    identify an expression of the subject in the image based on visibility of an entire iris of the subject in the image;
    identify the deviation amount based on the expression of the subject in the image and a difference between a second eye opening state of the subject in the image and the first eye opening state; and
    generate the deformed image in which the deviation amount between the second eye opening state and the first eye opening state is increased.

7. The information processing system according to claim 1, wherein the face authentication process includes authentication of an iris of an eye of the subject in the image.

8. The information processing system according to claim 1, wherein
  the deformed image includes a character image that replaces the subject in the deformed image, and
  the circuitry is further configured to increase the deviation of the character image from the at least one image capture condition based on the deviation amount.

9. The information processing system according to claim 1, wherein the circuitry is further configured to determine, based on an interpolation function, the deformation amount that corresponds to an increment of the deviation amount.

10. The information processing system according to claim 9, wherein the interpolation function is a linear interpolation function.

11. The information processing system according to claim 9, wherein the interpolation function is a spline interpolation function.

12. The information processing system according to claim 9, wherein the interpolation function is a non-linear stepwise interpolation function.

13. The information processing system according to claim 9, wherein the circuitry is further configured to determine the deformation amount as zero based on a failure of the image to deviate from the at least one image capture condition.

14. An information processing method, comprising:
  receiving an image, by a circuitry, associated with at least one image capture condition for a face authentication process;
  determining, by the circuitry, a blur amount of the image, wherein the blur amount is a degree of defocus of a subject in the image;

identifying, by the circuitry, a deviation amount of the image based on the blur amount, wherein the deviation amount indicates a deviation of the image from the at least one image capture condition;

determining, by the circuitry, a deformation amount based on the deviation amount;

controlling, by the circuitry, display of an authentication-in-progress graphical user interface for the face authentication process;

increasing, by the circuitry, a blur amount of a text of the authentication-in-progress graphical user interface based on the deformation amount;

generating, by the circuitry, a deformed image in which the increase of the blur amount of the text of the authentication-in-progress graphical user interface, from the at least one image capture condition, is by the deformation amount, wherein the deformed image includes the authentication-in-progress graphical user interface that replaces the subject in the image; and controlling display of the deformed image in which the blur amount of the text of the authentication-in-progress graphical user interface is increased by the deformation amount.

15. A non-transitory computer-readable medium having stored thereon computer-executable instructions which, when executed by a processor, cause the processor to execute operations, the operations comprising:

receiving an image associated with at least one image capture condition for a face authentication process;

determining a blur amount of the image, wherein the blur amount is a degree of defocus of a subject in the image;

identifying a deviation amount of the image based on the blur amount, wherein the deviation amount indicates a deviation of the image from the at least one image capture condition;

determining a deformation amount based on the deviation amount;

controlling display of an authentication-in-progress graphical user interface for the face authentication process;

increasing a blur amount of a text of the authentication-in-progress graphical user interface based on the deformation amount;

generating a deformed image in which the increase of the blur amount of the text of the authentication-in-progress graphical user interface, from the at least one image capture condition, is by the deformation amount, wherein the deformed image includes the authentication-in-progress graphical user interface that replaces the subject in the image; and controlling display of the deformed image in which the blur amount of the text of the authentication-in-progress graphical user interface is increased by the deformation amount.

* * * * *